(12) United States Patent
Zhang et al.

(10) Patent No.: US 12,117,068 B2
(45) Date of Patent: Oct. 15, 2024

(54) CIRCUMFERENTIAL LEVER BOOSTER AND TRANSMISSION MEANS THEREOF

(71) Applicants: Rongqiang Zhang, Hangzhou (CN); Wei Zhang, Hangzhou (CN); Weiqin Shou, Hangzhou (CN)

(72) Inventors: Rongqiang Zhang, Hangzhou (CN); Wei Zhang, Hangzhou (CN); Weiqin Shou, Hangzhou (CN)

( * ) Notice: Subject to any disclaimer, the term of this patent is extended or adjusted under 35 U.S.C. 154(b) by 0 days.

(21) Appl. No.: 18/554,952

(22) PCT Filed: Feb. 21, 2022

(86) PCT No.: PCT/CN2022/000024
§ 371 (c)(1),
(2) Date: Oct. 11, 2023

(87) PCT Pub. No.: WO2022/217981
PCT Pub. Date: Oct. 20, 2022

(65) Prior Publication Data
US 2024/0200641 A1    Jun. 20, 2024

(30) Foreign Application Priority Data

Apr. 12, 2021 (CN) .......................... 202110387091.9

(51) Int. Cl.
*F16H 21/22* (2006.01)
(52) U.S. Cl.
CPC .................................. *F16H 21/22* (2013.01)
(58) Field of Classification Search
CPC .......... F16H 21/22; F16H 21/32; F16H 21/50; F16H 23/00; F16H 23/10; F16H 49/00; F16H 49/001

USPC ............................................................ 74/60
See application file for complete search history.

(56) References Cited

U.S. PATENT DOCUMENTS

2006/0231787 A1\* 10/2006 Varriale .................. F16H 23/10
251/213

FOREIGN PATENT DOCUMENTS

| CN | 201407328 Y | 2/2010 |
|---|---|---|
| CN | 202118192 U | 1/2012 |
| CN | 102996751 A | 3/2013 |
| CN | 110566643 A | 12/2019 |
| CN | 113090727 A | 7/2021 |
| JP | 2019002478 A | 1/2019 |
| KR | 20200120331 A | 10/2020 |

(Continued)

*Primary Examiner* — Joseph Brown
(74) *Attorney, Agent, or Firm* — Westbridge IP LLC

(57) ABSTRACT

A circumferential lever booster includes a transmission part that is fixedly connected to an input eccentric wheel; the input eccentric wheel is movably connected to a circumferential surface of an acting force end on a lever arm group by means of a bearing; the other end of the lever arm group is movably supported with a circumferential support seat; and the circumferential surface of the lever arm group at said end is movably connected to a bearing fixed on the eccentric axis of an output eccentric wheel; a lever prying force is applied while a circumferential swinging force is transmitted, so as to act on the output eccentric wheel; and the eccentric wheel is fixedly connected to a transmission part to output a boost. The circumferential lever booster can achieve boosting when the eccentricity of the input eccentric wheel and output eccentric wheel is equal.

20 Claims, 25 Drawing Sheets

(56) References Cited

FOREIGN PATENT DOCUMENTS

WO     WO2006051134 A1     5/2006

\* cited by examiner

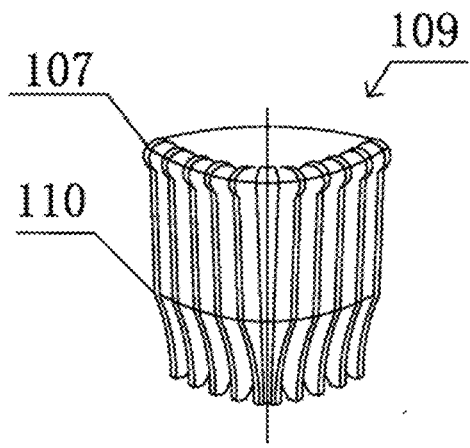
FIG.1-A
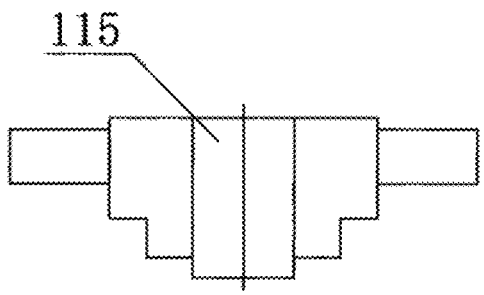
FIG.1-B
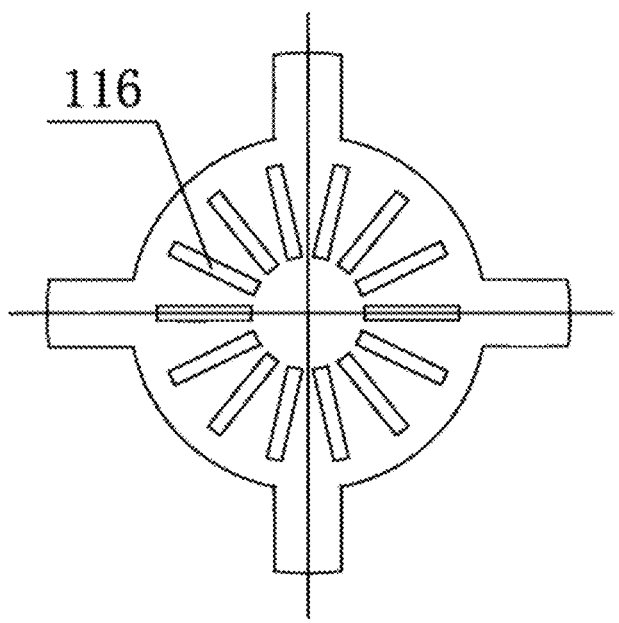
FIG.1-C

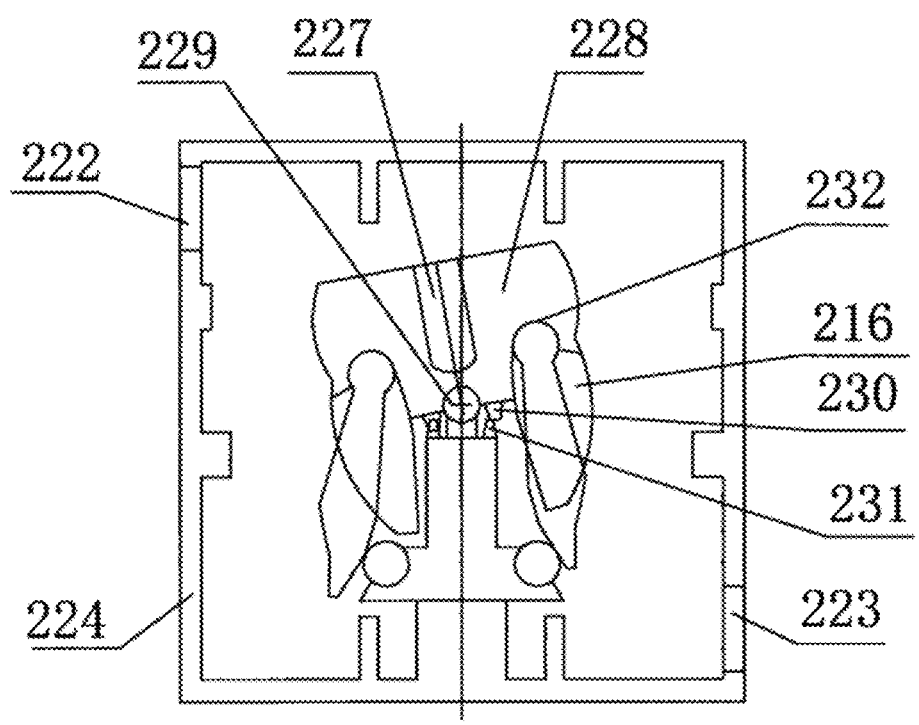
FIG. 2-A

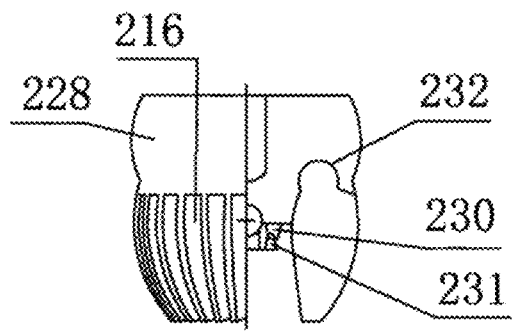
FIG. 2-B
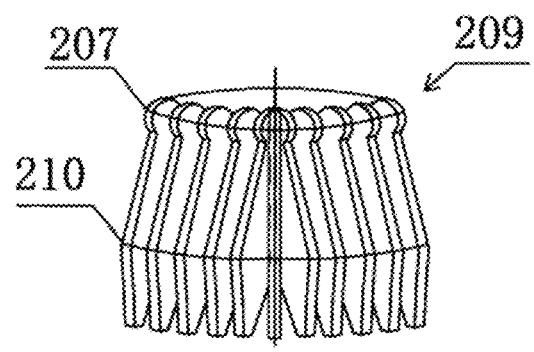
FIG. 2-C
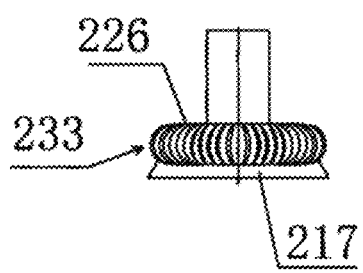
FIG. 2-D
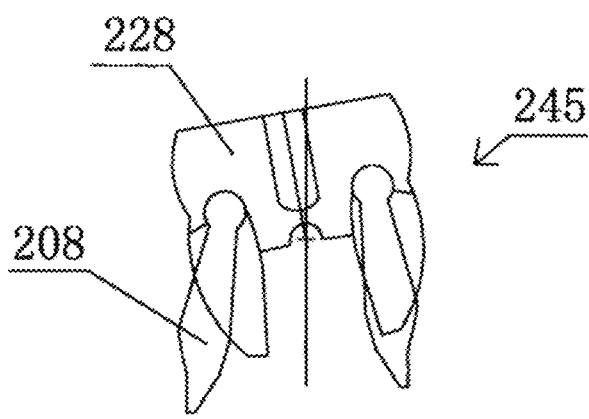
FIG. 2-E

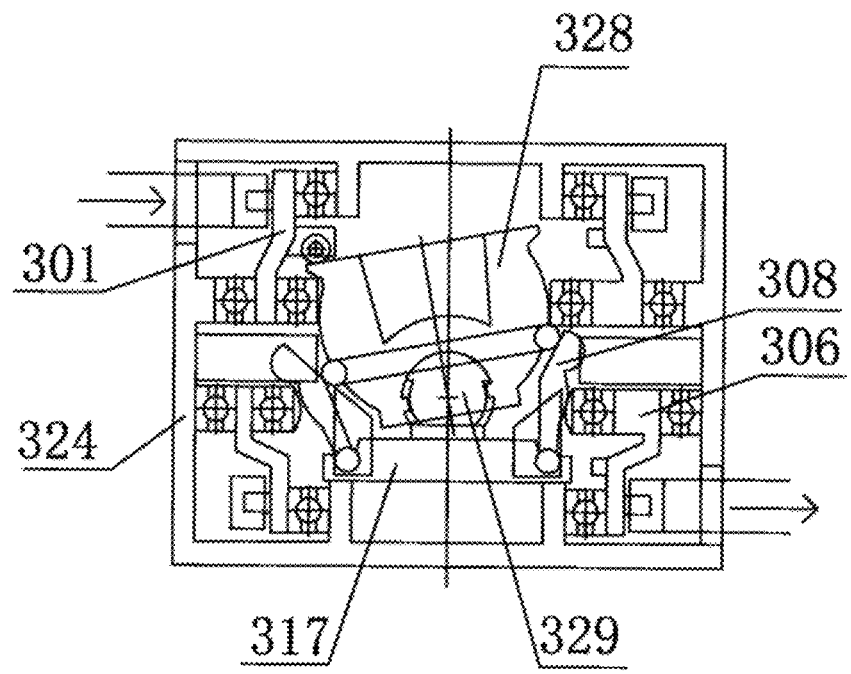
FIG. 3
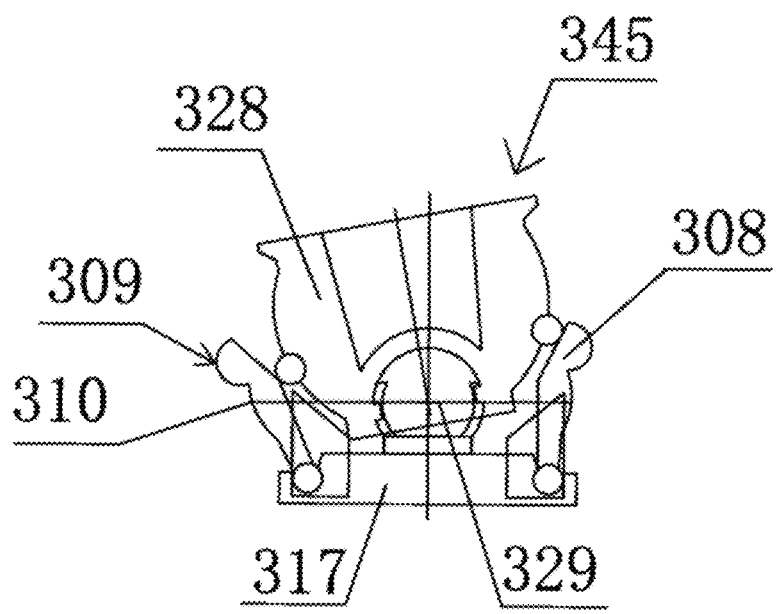
FIG. 3-A

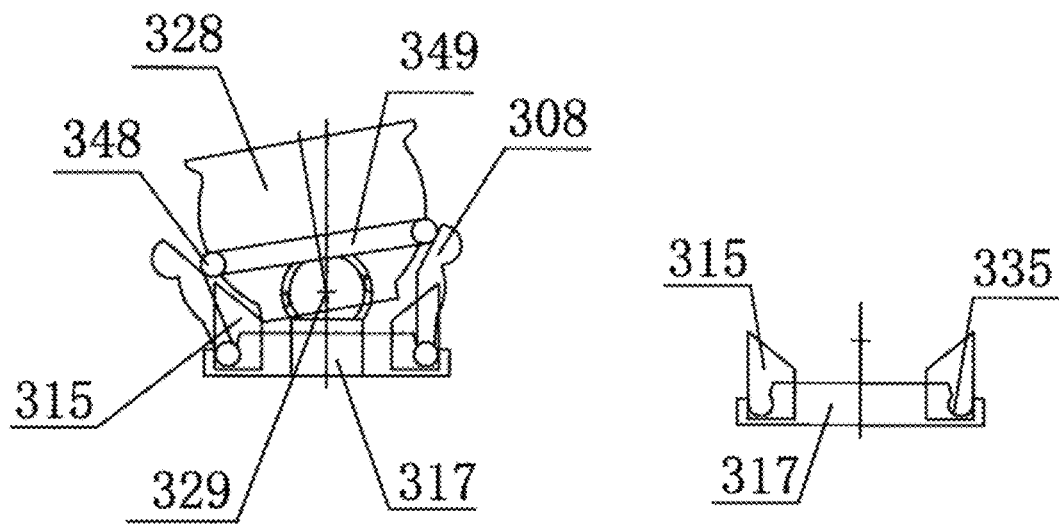
FIG. 3-B
FIG. 3-C
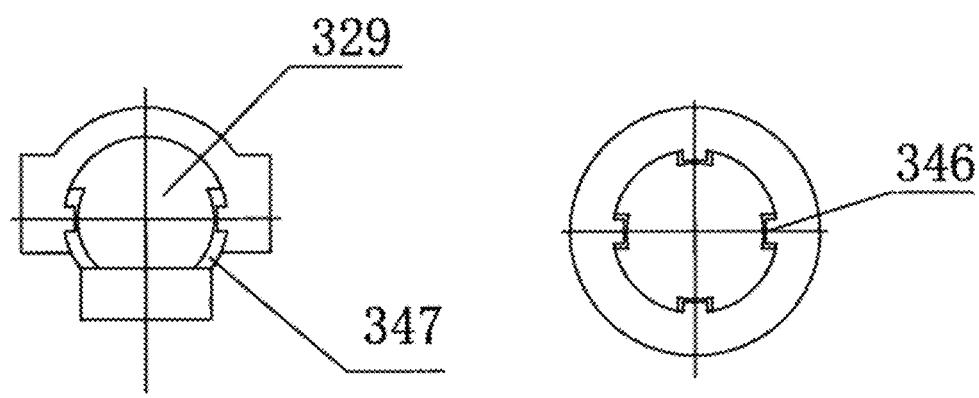
FIG. 3-D
FIG. 3-E

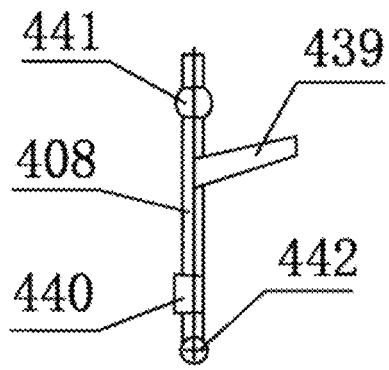
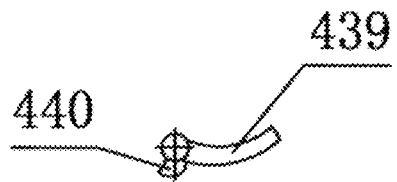
FIG. 4-A  FIG.4-B
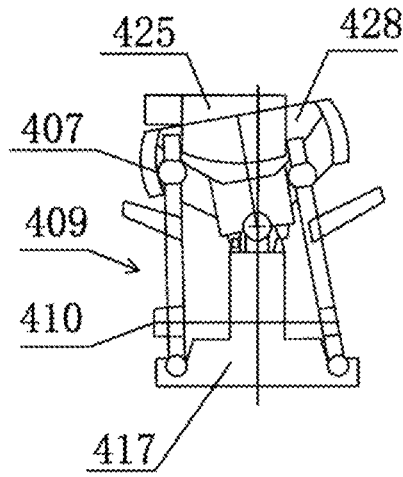
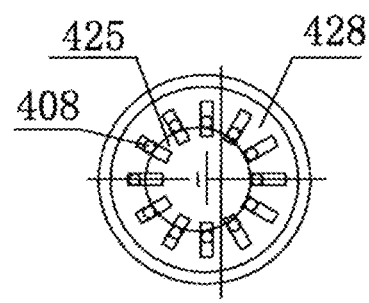
FIG. 4-C  FIG.4-D
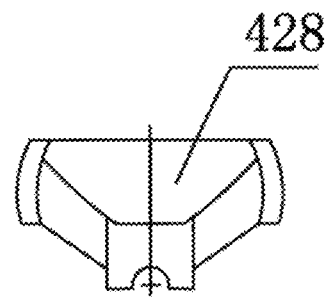
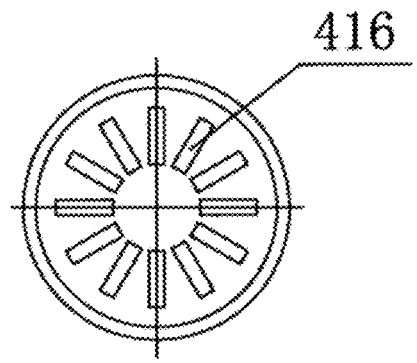
FIG. 4-E  FIG.4-F

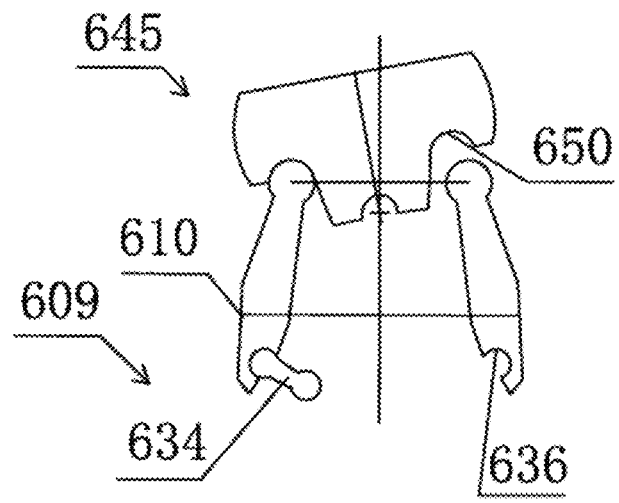
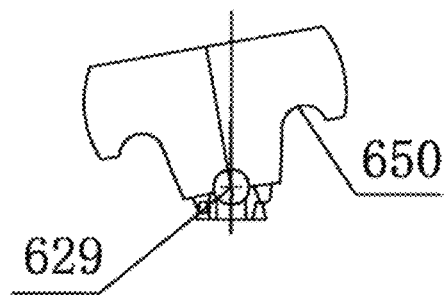
FIG. 6-A
FIG. 6-B
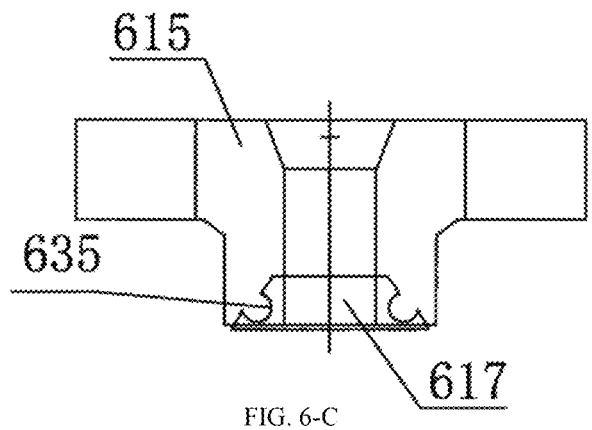
FIG. 6-C
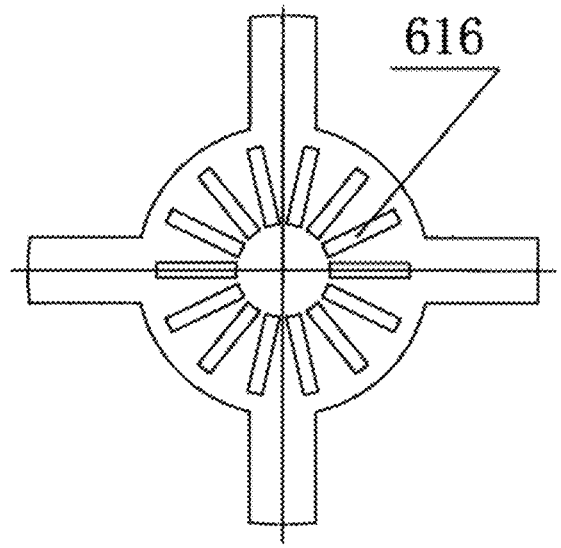
FIG. 6-D

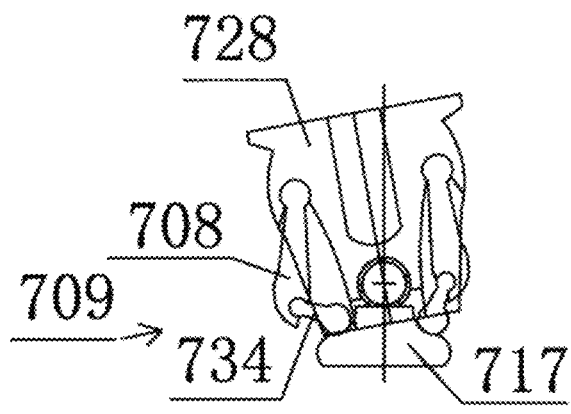
FIG. 7-A
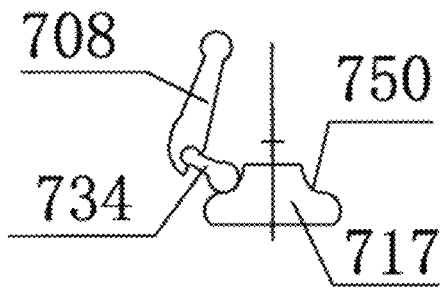
FIG. 7-B
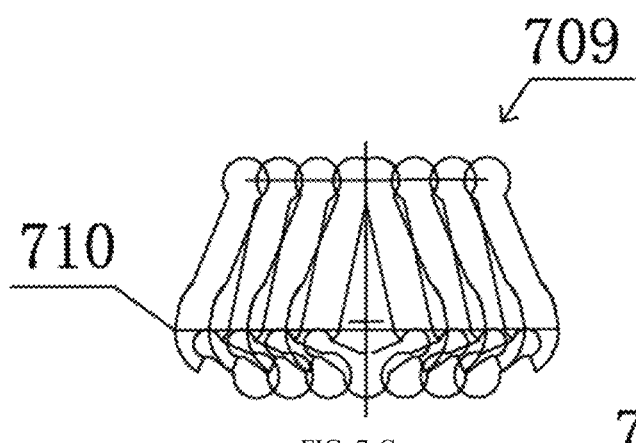
FIG. 7-C
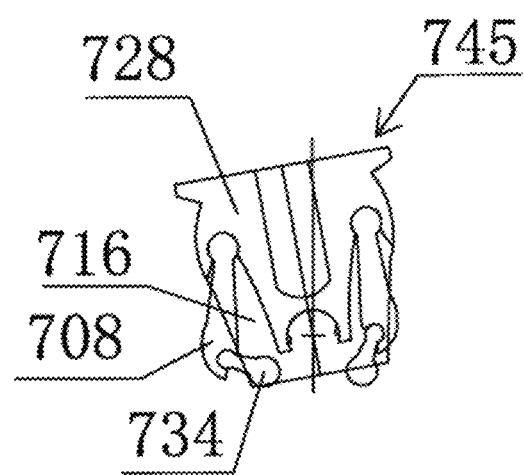
FIG. 7-D

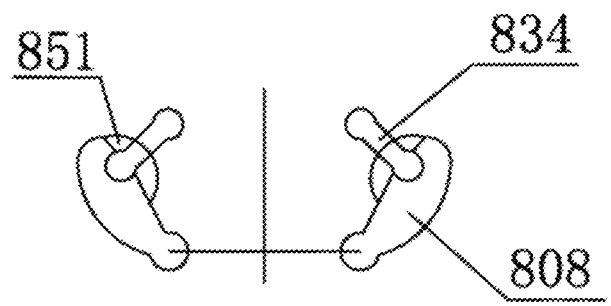
FIG. 8-A
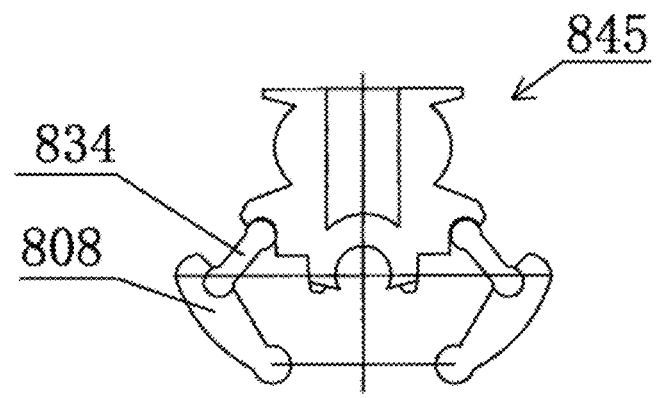
FIG. 8-B
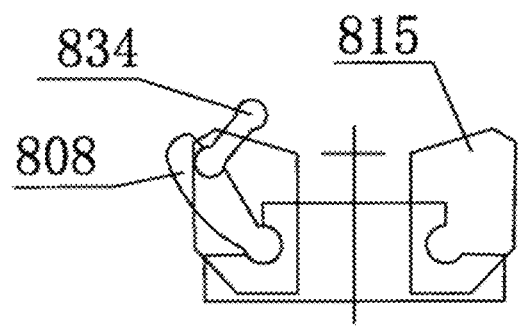
FIG. 8-C

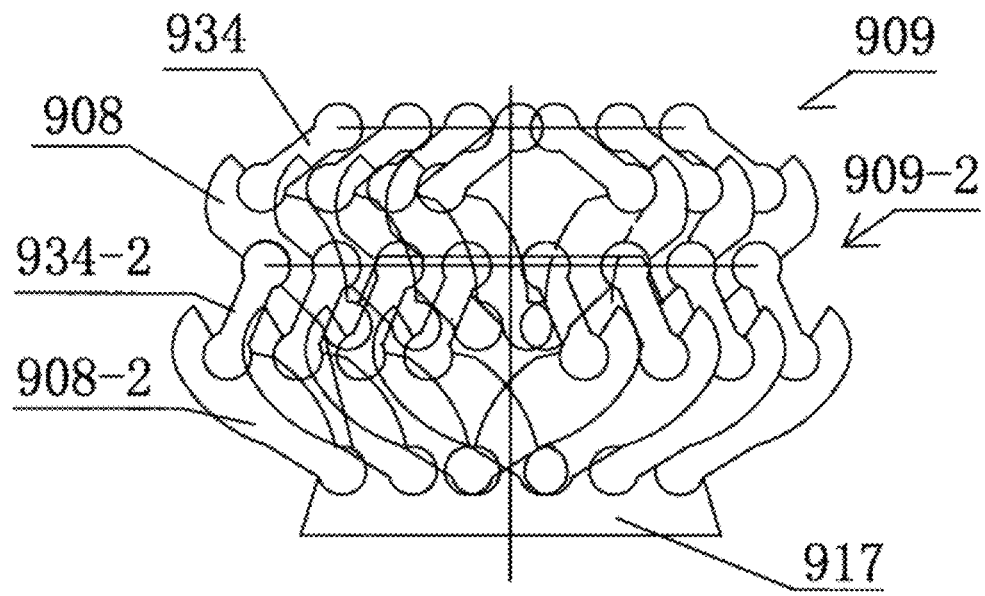
FIG. 9-A
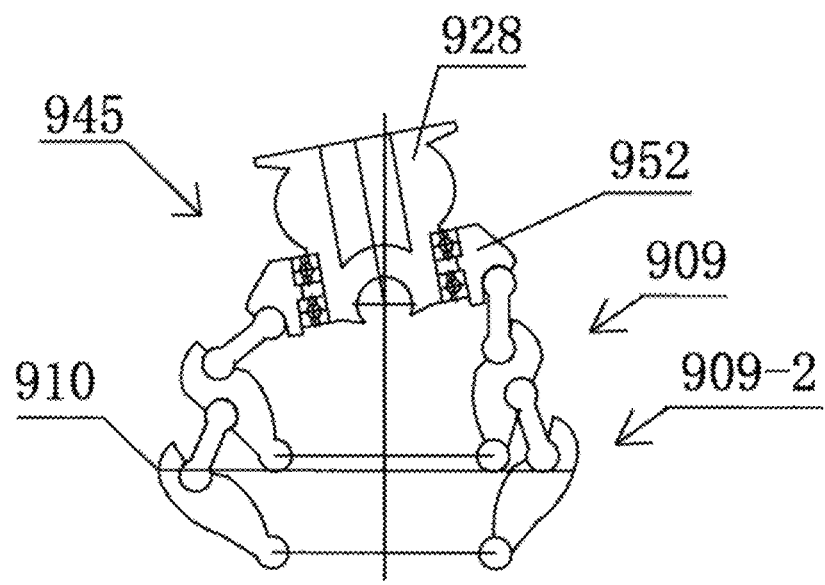
FIG. 9-B

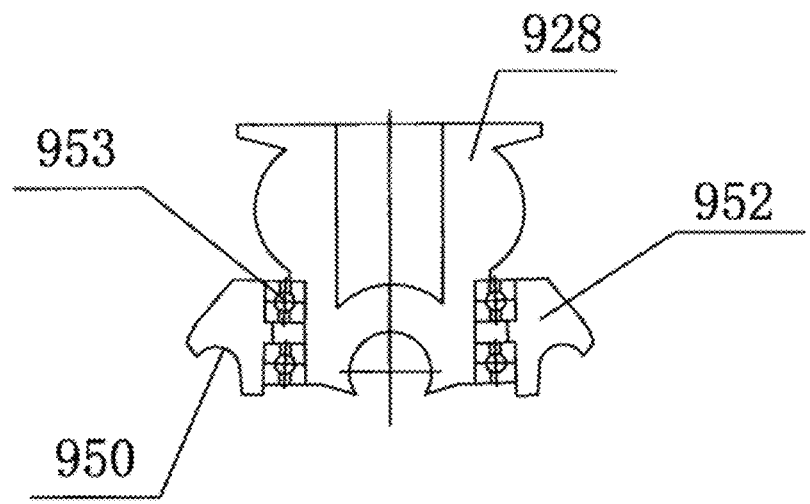
FIG. 9-C
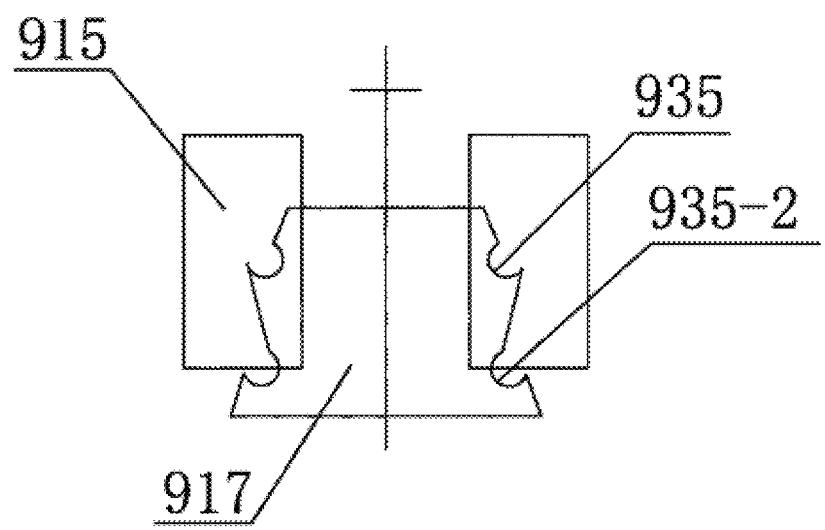
FIG. 9-D

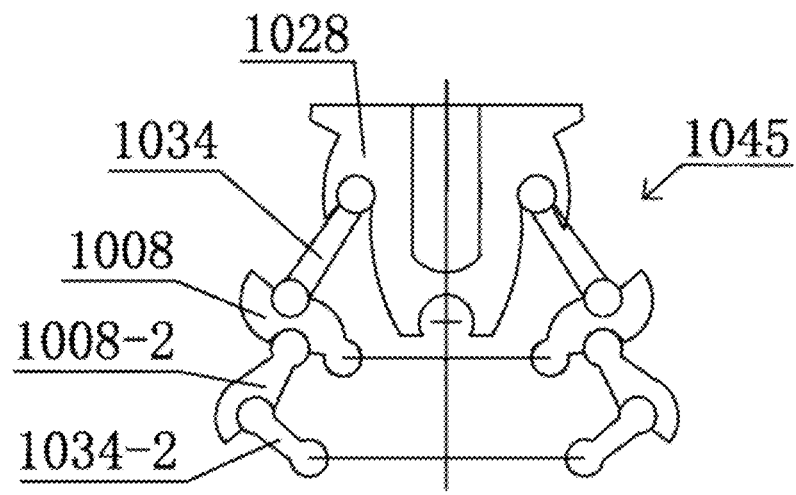
FIG. 10-A
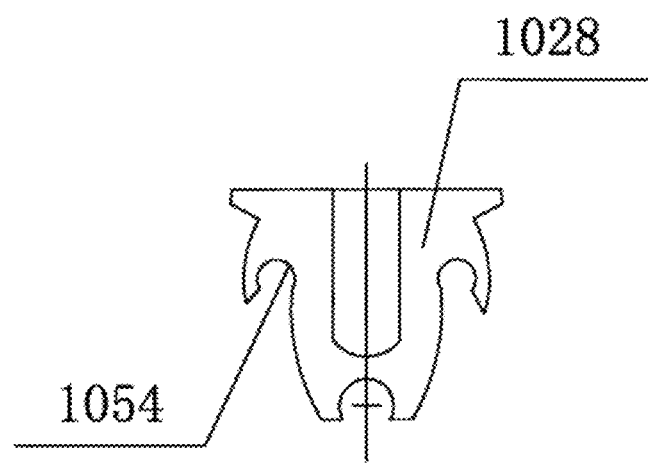
FIG. 10-B

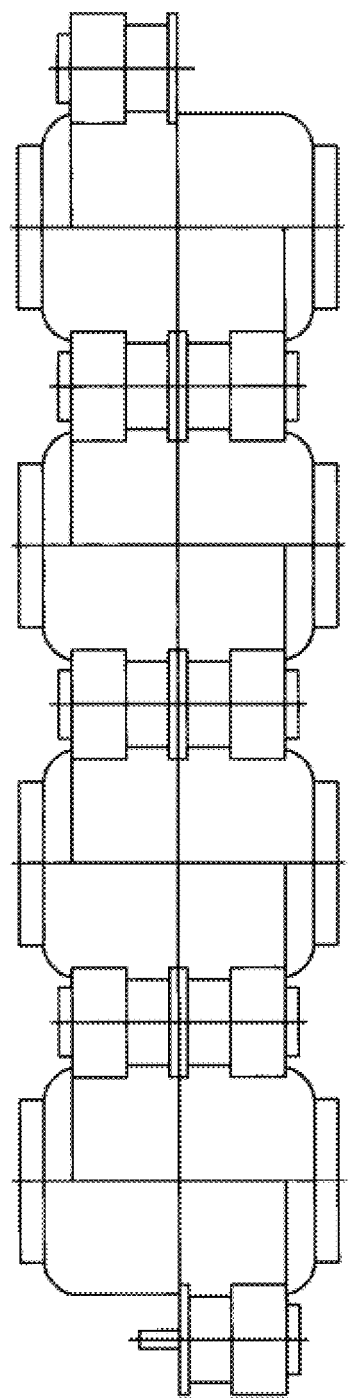
FIG. 11-A

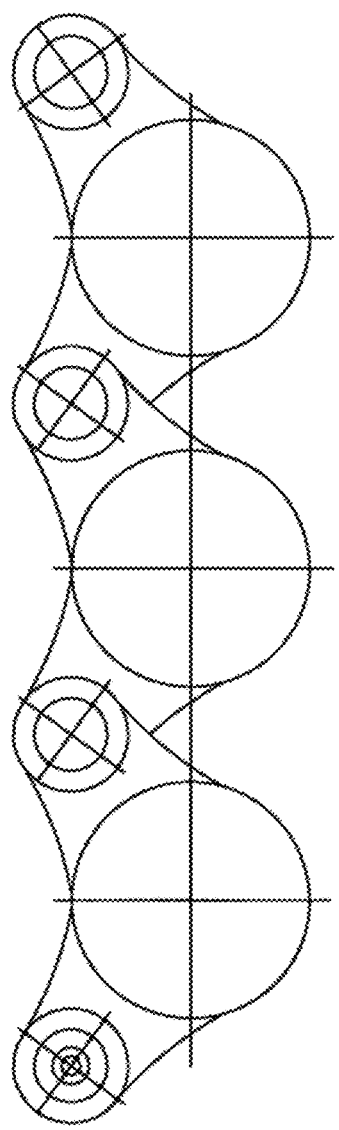
FIG. 12-A

CIRCUMFERENTIAL LEVER BOOSTER AND TRANSMISSION MEANS THEREOF

FIELD OF THE INVENTION

The present invention relates to the technical field of circular transmission, and particularly to circumferential lever transmission machinery.

BACKGROUND OF THE INVENTION

In existing mechanical transmission power equipment, it is basically difficult to increase the torque transmitted by the equipment without changing the rotation speed. It is even more difficult to achieve when it is required to significantly increase the output torque while still maintaining the speed unchanged. Taking a reducer in existing power equipment as an example, although it can greatly improve the mechanical performance of the output torque, the rotation speed is also reduced dramatically. The other two mechanical performances of the reducer include good self-locking functions and transmission in series. However, after the reducer is connected in series, the output torque force is further increased, but its rotation speed is reduced. Besides, the more the series connections are, the lower the speed is, or even no speed. Therefore, to increase torque and power with a reducer, the speed must be affected. In application scenarios that require both power and speed, it is an expected goal that cannot be achieved. Therefore, the reducer can only be used as a reducer.

It is expected to have a transmission power device or equipment that has multiple effective mechanical performances and characteristics in one machine, i.e., 1, having good structural performance characteristics for transmitting power; 2, being able to multiple the torque force in the mechanical transmission process; 3, having good self-locking functions; 4, being able to geometrically increase the torque force through effective series transmission. These are all great problems and challenges that we should overcome.

SUMMARY OF THE INVENTION

In order to achieve the above objects, the present invention adopts the following technical solutions:

A circumferential lever booster comprises an acting force input mechanism, a circumferential lever boosting mechanism, a boost output mechanism and a machine body shell. The circumferential lever booster is characterized in that:

the acting force input mechanism is provided with an input transmission part that is fixedly connected to an input eccentric wheel; the input eccentric wheel is positioned through a central axis of a machine body, and is fixedly connected to the machine body shell by means of a bearing;

the circumferential lever boosting mechanism is provided with a lever arm group which is formed by circumferentially and uniformly distributing a plurality of lever arms; a circumferential surface formed at one end of the lever arm group is movably connected to the bearing fixedly connected to the eccentric axis of the input eccentric wheel; a circumferential surface formed at the other end of the lever arm group is movably supported with a circumferential support seat; otherwise, the circumferential surface formed at one end of the lever arm group is movably supported with the bearing fixedly connected to the eccentric axis of the input eccentric wheel; the circumferential surface formed at the other end of the lever arm group is movably connected to the circumferential support seat; the circumferential support seat is positioned through the central axis of the machine body, and is fixedly connected to the machine body shell; a circumferential surface of an output lever arm group formed on the lever arm group is movably connected to the bearing fixedly connected to the eccentric axis of an output eccentric wheel;

the boost output mechanism is provided with an output transmission part which is fixedly connected to the output eccentric wheel; and the output eccentric wheel is positioned through the central axis of the machine body, and is fixedly connected to the machine body shell by means of a bearing.

Further, the lever arms are movably connected to the bearing on the input eccentric wheel or the circumferential support seat in an embedded manner.

Further, a long arm can be transversely and fixedly arranged at an acting force end on the lever arm, and a short arm is arranged at the other end of the lever arm; an eccentric driving component is fixedly connected to the input eccentric wheel, and drives and pushes the long arm transversely and fixedly arranged at one end of the lever arm to rotate.

Further, a reinforcing bush is arranged at a movable connection of the bearing fixedly connected to the eccentric axis of the input eccentric wheel and the eccentric axis of the output eccentric wheel and the circumferential surface of the lever arm group; and the reinforcing bush and the bearing can be integrally machined, and can also be assembled after being machined in a split manner.

Further, the lever arm group is provided with a guide groove disc, and guide grooves in the guide groove disc are equal to the lever arms in number and are circumferentially and uniformly distributed in a one-to-one correspondence mode, so as to position and protect the movement track of the lever arms.

Further, the eccentricity of the input eccentric wheel is relatively smaller than or equal to that of the output eccentric wheel.

Further, the input eccentric wheel and the output eccentric wheel are each provided with a balance component.

Further, supporting rolling parts are arranged between the movable supporting surface of the bearing on the input eccentric wheel or the circumferential support seat and the movable supporting surface of the lever arm group, and the supporting rolling parts correspond to the lever arms in a one-to-one mode and are circumferentially and uniformly distributed.

Further, the lever arm group is movably connected to a swinging body, and the swinging body is movably connected to the input eccentric wheel.

Further, one end of the swinging body is connected to a universal fulcrum, and the other end of the swinging body is movably connected to the bearing fixedly connected to the eccentric axis of the input eccentric wheel in a matched manner; and the universal fulcrum is positioned through the central axis of the machine body, and is fixedly connected to the machine body shell.

Further, guide grooves can be formed in the swinging body, the guide grooves are equal to the lever arms in number and are circumferentially and uniformly distributed in a one-to-one correspondence mode, so as to position and protect the movement track of the lever arms.

Further, the guide grooves and the swinging body can be integrally machined, or combined after being machined in a split manner.

Further, the swinging body is provided with a swinging positioning mechanism.

Further, the swinging positioning mechanism can be arranged to be a set of circumferential meshing positioning teeth; one tooth is positioned through the central axis of the swinging body, and fixedly connected to the swinging body; and the other tooth is positioned through the central axis of the machine body, and fixedly connected to the support seat.

Further, the swinging positioning mechanism can be arranged to be a set of meshing positioning components on the universal fulcrum.

Further, a pressure roller is fixedly connected to the input eccentric wheel, and the pressure roller is movably pushed and rotated with one end of the swinging body and/or one end of each lever arm.

Further, one end of each lever arm is movably connected to a supporting rod, and the other end of each supporting rod is movably connected to or movably supported with the bearing on the input eccentric wheel or the circumferential support seat.

Further, movable supporting surface is provided by the bearing on the input eccentric wheel or the circumferential support seat and each supporting rod, concave circular step surfaces are arranged on the movable supporting surface.

Further, the concave circular step surfaces and the bearing on the input eccentric wheel or the circumferential support seat can be integrally machined, or the concave circular step surfaces are machined into concave circular step parts in a split manner and then combined with the bearing on the input eccentric wheel or the circumferential support seat.

Further, the concave circular step parts machined in the split manner can be connected to the input eccentric wheel in a positioning and matched manner by means of a bearing.

Further, the lever arm is provided with double-side protection skirts to position and protect the supporting rods movably connected to the lever arms.

Further, one end of the lever arm can be movably connected to a connecting component or the circumferential support seat in a ball joint mode.

Further, spherical pits are uniformly distributed in the circumference of the connecting component movably connected to the ball joint at one end of the lever arm, or distributed in the circumference of the circumferential support seat in a one-to-one correspondence mode.

Further, the lever arm group can be used in a multi-stage connection mode.

Further, the acting force input mechanism and the boost output mechanism can be arranged to be in shaft end and non-shaft end input and output modes.

Further, when the acting force input mechanism and the boost output mechanism are in the non-shaft end input and output modes, an input opening and an output opening can be formed in the shell wall of the machine body shell according to needs, and are used for allowing transmission parts such as belts, chains and gears on external transmission parts to be mounted and penetrate through correspondingly.

Further, the input opening and/or the output opening can be formed in any effective input and output position on the circumference of the machine body shell according to needs.

Further, the two eccentric axes of an input eccentric wheel and an output eccentric wheel can be arranged at an angle.

Further, an external connection transmission shaft, external connection transmission parts and the like are arranged at external connection ports of the acting force input mechanism and the boost output mechanism by means of the bearings.

Further, in a case of a requirement for a light application scene, even-distribution hollow treatment can be conducted on the non-matching face or the non-connection supporting structure of the machine body.

Further, the circumferential lever booster can conduct forward and reverse circumferential rotation movement or angular reciprocating rotation movement.

Further, the circumferential lever booster is provided with a self-splashing type lubricating system or is externally connected to a lubricating source or a pump station for combined lubrication.

Further, the circumferential lever booster can be applied vertically and can also be applied transversely.

Further, the circumferential lever booster can be applied in a single-machine transmission mode and can also be applied in a series combined transmission mode.

Further, the circumferential lever boosters applied in a series connection mode can share the same machine body shell.

Further, the circumferential lever boosters applied in a series combined mode and sharing the same machine body shell can share the same lubricating system.

The transmission mode of the circumferential lever booster is that: an acting force is applied to drive the input transmission part and the input eccentric wheel fixedly connected to the input transmission part to rotate, and meanwhile, the bearing fixedly connected to the eccentric axis of the input eccentric wheel acts on one end of the lever arm group which is movably connected to or movably supported with the bearing, so that a resultant force of circumferential swinging and axial prying acts on the lever arm group in a pushing and rotating mode, and then the lever arm group is promoted to do circumferential swinging and axial reciprocating motion with the movable supporting or movable connecting position between the other end of the lever arm group and the support seat as the fulcrum; and meanwhile, the bearing fixedly connected to the eccentric axis of the output eccentric wheel movably connected to the circumferential surface of the output lever arm group is used for driving the output eccentric wheel to rotate, and then the output transmission part on the output eccentric wheel is driven to output a boost.

Further, the lever arm group can be movably connected to or movably supported with the bearing fixedly connected to the eccentric axis of the input eccentric wheel by means of the swinging body; and one end of the swinging body is connected to the universal fulcrum fixed to the central axis of a machine body, and the other end of the swinging body is movably connected to the bearing fixedly connected to the eccentric axis of the input eccentric wheel.

Further, the lever arms can be used in a multi-stage mode, such that the lever arms are movably connected to the circumferential surface of the lever arm group formed by the lever arm group used in the multi-stage mode to push the bearing on the eccentric axis of an output eccentric wheel to rotate, the output eccentric wheel is driven to rotate, and then boost is output.

Further, the input acting force can be input through the shaft end or the non-shaft end, and the boost is output at the output end in a shaft end or non-shaft end mode through the boosting effect of the circumferential lever boosting mechanism.

A boosting method of the circumferential lever booster is that circumferential rotation eccentric acting force generated by rotation of the input eccentric wheel is used for driving the lever arm group to do circumferential swinging and axial reciprocating motion with the circumferential support position at one end as the fulcrum, thus the output eccentricity is effectively compensated while the circumferential surface of the lever arm group is pushed, rotated and pried to act on load force on the output eccentric wheel, and therefore output boost is generated and transmitted.

Further, according to the circumferential lever booster, multiple lever arms are combined circumferentially into the lever arm group to achieve overall linkage so as to achieve prying force of levers.

Further, according to the circumferential lever booster, the lever force fulcrum is designed to be a movable fulcrum on the circumference to achieve boosting.

Further, according to the circumferential lever booster, boosting is achieved through a method that the acting force of the input end is increased by reducing the eccentricity of the input eccentric wheel and meanwhile applying the lever arms and bearing rods.

Further, according to the circumferential lever booster, plane circumferential radial rotation force of the eccentric wheel at the input end is changed into comprehensive acting force tending to the radial direction and the axial direction, and therefore reverse rotation force from the load force direction can be effectively resisted, and boosting is achieved.

Further, according to the circumferential lever booster, the lever arms are linked to realize the combined action of multiple forces, and boosting is achieved.

Further, according to the circumferential lever booster, the boosting is improved by additionally arranging transverse long and short arms on the lever arms.

Further, according to the circumferential lever booster, single lever arms are integrated into the multiple lever arms to achieve continuous and circulating prying on the circumference, multiple prying forces accumulated on the circumference are used for achieving continuous and overall circumferential circulating prying force, and therefore boosting is achieved.

Further, according to the circumferential lever booster, a lever body assembly method is adopted, and the lever arm groups are movably connected to the swinging body to effectively improve output torque force.

Further, according to the circumferential lever booster, multiple-grade lever arm groups are stacked and connected to achieve boosting.

Further, according to the circumferential lever booster, multiple single machines are effectively combined and connected in series for transmission, and therefore larger output torque force is improved.

Further, the fulcrums and load force points of the lever arm groups are arranged at the close positions, so that the prying force is increased, meanwhile, the load force from the direction of the output eccentric wheel is effectively blocked, the self-locking and retaining functions are achieved, and boosting is further improved.

An application mode of the circumferential lever booster is that: multiple machines can be effectively connected in series for transmission application.

Further, when the multiple machines are connected in series for transmission application, vertical type series transmission or horizontal type series transmission can be implemented.

Further, when the multiple machines are connected in series for transmission application, shaft end series transmission or non-shaft end series transmission can be implemented.

The technical solution of the present invention has the following beneficial technical effects:

according to the technical solution of the present invention, the mechanical transmission structure is reasonable, and the mechanical performance characteristic of good power transmission is achieved.

According to the technical solution of the present invention, the output torque force can be multiplied through mechanical transmission.

According to the technical solution of the present invention, the transmission mechanism has a self-locking function, and especially when multi-grade levers are stacked and connected, the self-locking function of the whole machine is further enhanced.

According to the technical solution of the present invention, the requirement for mechanical lubrication is high, but due to the good mechanical transmission structure and shell design, the lubrication problem is effectively solved.

According to the technical solution of the present invention, the transmission force can be rotated in the forward and reverse circumferential directions, and the angle reciprocating type transmission force can be achieved.

According to the technical solution of the present invention, in terms of the transmission form, single machines can be independently used, or multiple single machines can be effectively connected in series, and geometric-level output torque boost is transmitted.

According to the technical solution of the present invention, light weight can be achieved, heavy weight can also be achieved, and moreover, integrated combined application can be achieved. The application scene range is wide.

According to solution of the present invention, it can be regarded as kinetic energy storage device, which can convert small kinetic energy into super-large kinetic energy.

According to the technical solution of the present invention, external input kinetic energy sources can be in multiple forms.

According to the technical solution of the present invention, it is environmentally-friendly, pollution-free and has low noise.

BRIEF DESCRIPTION OF THE DRAWINGS

The technical solutions of the present invention will be e described in more detail below with reference to the accompanying drawings, in which preferred specific embodiments are illustrated.

FIG. 1-A to FIG. 1-C are schematic diagrams of partial structures in the schematic structural diagram of FIG. 1.

Figure 1:
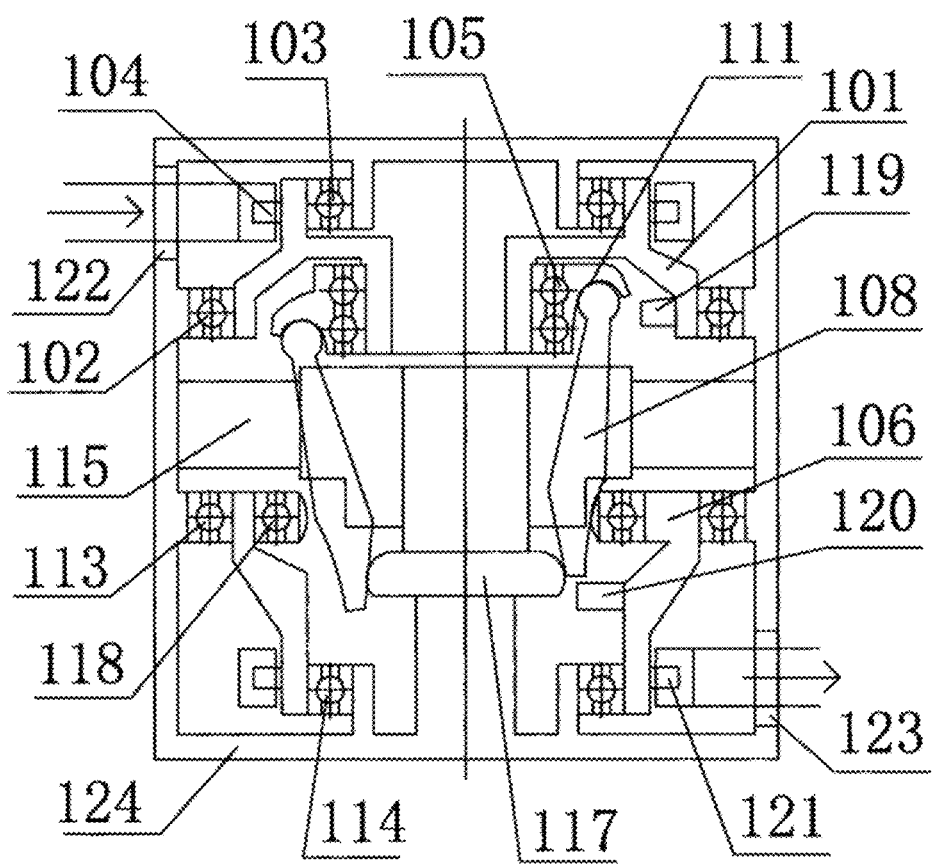
FIG. 1 is a schematic structural diagram of the first embodiment of the present invention.

Of which, FIG. 1-B is a schematic diagram of a guide groove disc of the present invention.

Of which, FIG. 1-C is a top view of FIG. 1-B.

Figure 2:
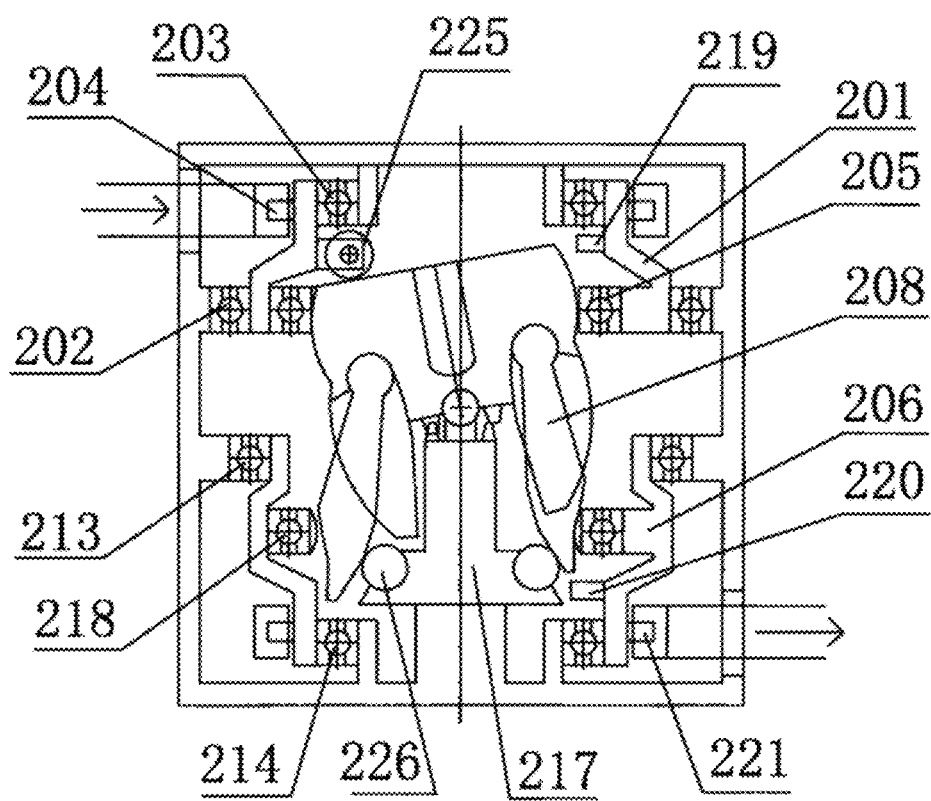

FIG. 2 and FIG. 2-A are schematic structural diagrams of the second embodiment of the present invention.

Of which, FIG. 2-B is a schematic structural diagram of a swinging body.

Of which, FIG. 2-C is a schematic structural diagram of a lever arm group.

Of which, FIG. 2-D is a schematic structural diagram of a circumferential layout of a support seat roller.

Of which, FIG. 2-E is a schematic structural diagram of a lever body assembly.

FIG. 3 is a schematic structural diagram of the third embodiment of the present invention.

FIG. 3-A to FIG. 3-E are partial views of the schematic structural diagram of FIG. 3.

Of which, FIG. 3-A is a schematic structural diagram of a lever body assembly in this embodiment.

Of which, FIG. 3-B is a schematic structural diagram of a swinging body roller group in this embodiment.

Of which, FIG. 3-C is a schematic structural diagram of a guide groove disc and a circumferential support seat in this embodiment.

Of which, FIG. 3-D is a schematic structural diagram of a sliding groove of a universal fulcrum in this embodiment.

Of which, FIG. 3-E is a schematic structural diagram of positioning teeth of a universal fulcrum in this embodiment.

Figure 4:
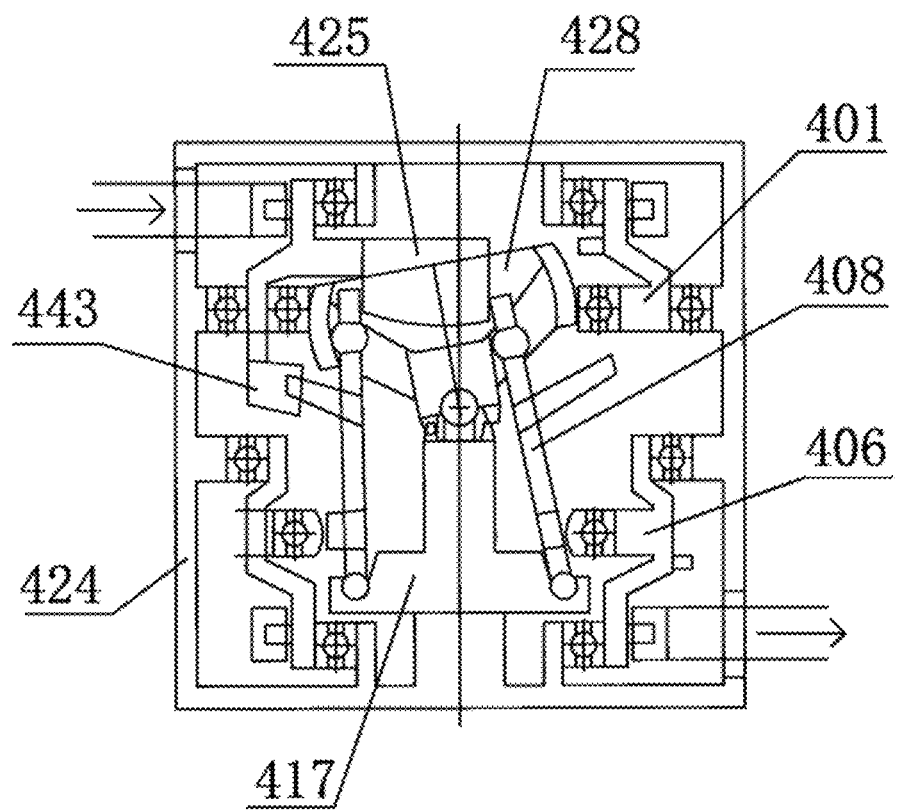

FIG. 4 is a schematic structural diagram of the fourth embodiment of the present invention.

FIG. 4-A to FIG. 4-F are partial views of the schematic structural diagram of the embodiment in FIG. 4.

Of which, FIG. 4-A is a schematic structural diagram of a lever arm in this embodiment.

Of which, FIG. 4-B is a top view of a lever arm of FIG. 4-A in this embodiment.

Of which, FIG. 4-C is a schematic structural diagram of a lever body assembly in this embodiment.

Of which, FIG. 4-D is a top view of a lever body assembly of FIG. 4-C in this embodiment.

Of which, FIG. 4-E is a schematic structural diagram of a swinging body in this embodiment.

Of which, FIG. 4-F is a top view of a swinging body of FIG. 4-E in this embodiment.

Figure 5:
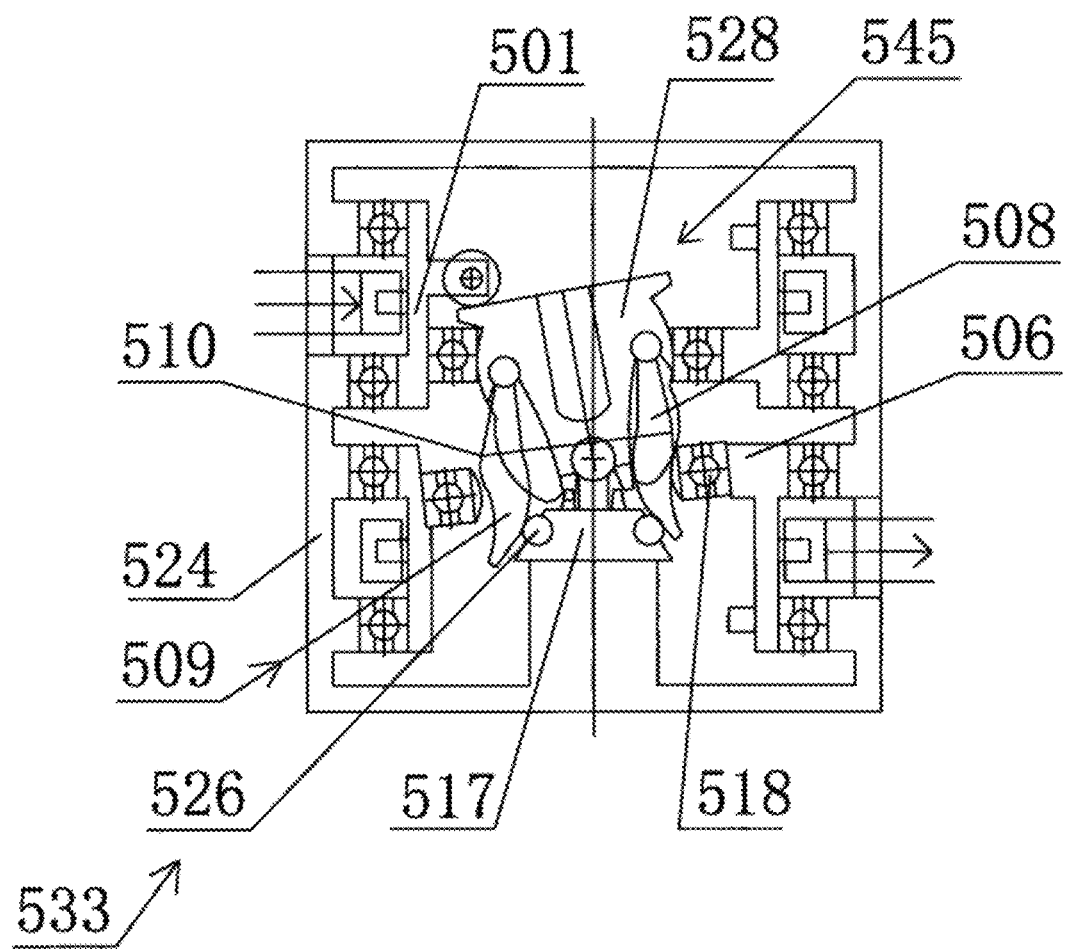

FIG. 5 is a schematic structural diagram of the fifth embodiment of the present invention, mainly illustrating the structural position of an eccentric bearing of an output eccentric wheel in the technical solution.

Figure 6:
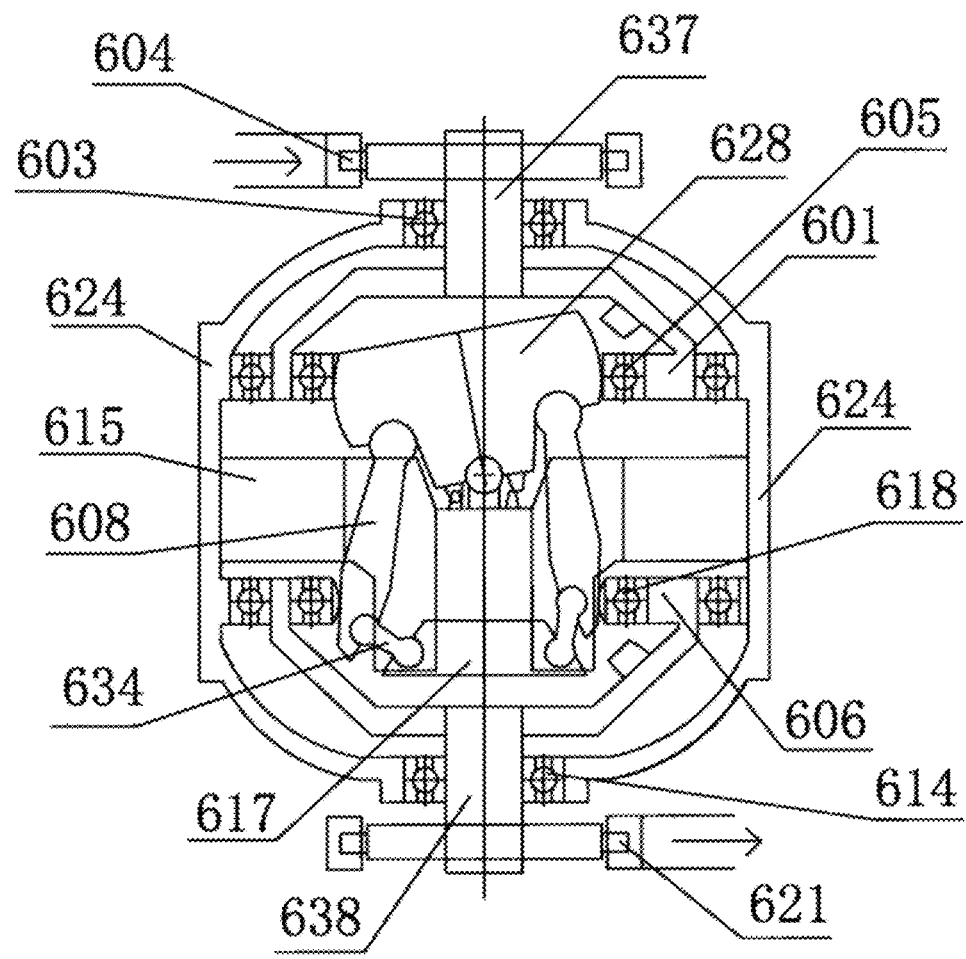

FIG. 6 is a schematic structural diagram of the sixth embodiment of the present invention.

Of which, FIG. 6-A to FIG. 6-D are partial views of the schematic structural diagram of FIG. 6. At the same time, a schematic diagram of the structure and transmission form of a lever arm and a supporting rod is shown.

Of which, FIG. 6-A is a schematic diagram of the structural position of the supporting rod between the lever arm on the swinging body and the supporting rod and the circumferential support seat in the present invention.

Of which, FIG. 6-B is a schematic structural diagram of the concave circular step surfaces on the swinging body and supporting rods in the present invention.

Of which, FIG. 6-C is a structural position diagram of a guide groove disc and a circumferential support seat in the present invention.

Of which, FIG. 6-D is a schematic structural diagram of guide grooves in the present invention.

Figure 7:
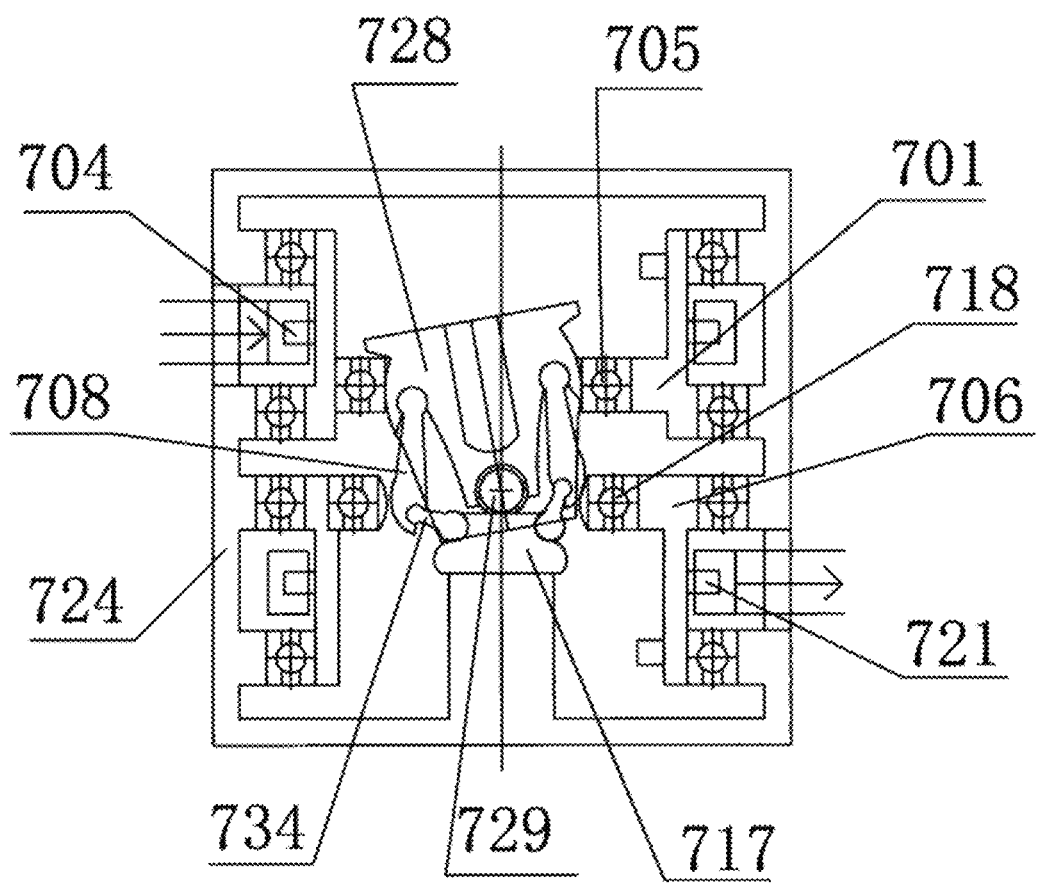

FIG. 7 is a schematic structural diagram of the seventh embodiment of the present invention.

Of which, FIG. 7-A to FIG. 7-D show the schematic diagrams of another movable connection structure and position of the lever body of the circumferential lever booster acting on the lever arm based on the basic structure and principles disclosed in the sixth embodiment of the present invention.

Of which, FIG. 7-A is a schematic diagram of the structural position of a lever body assembly of the present invention.

Of which, FIG. 7-B is a schematic structural diagram of a lever arm, a supporting rod and a circumferential support seat in the present invention.

Of which, FIG. 7-C is a schematic diagram of the structural position of a lever arm group of the present invention.

Of which, FIG. 7-D is a schematic diagram of the structural position of a lever body assembly in the present invention.

Figure 8:
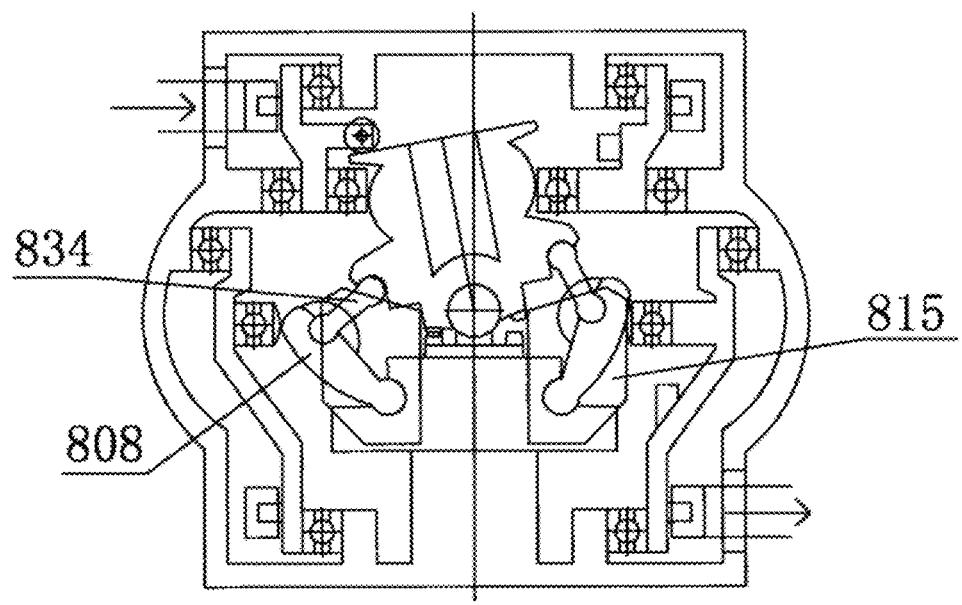

FIG. 8 is a schematic structural diagram of the eighth embodiment of the present invention.

Of which, FIG. 8-A to FIG. 8-C are schematic diagrams of another lever force-boosting structure layout of the circumferential lever booster of the present invention based on the above seventh embodiment.

Of which, FIG. 8-A is a schematic structural diagram of double-side protection skirts of the lever arm and supporting rod in the present invention.

Of which, FIG. 8-B is a schematic diagram of a lever body assembly and a schematic diagram of a circumferential surface of a lever arm group of the present invention.

Of which, FIG. 8-C is a schematic diagram of the structural positions of a lever arm, a guide groove disc and a circumferential support seat in the present invention.

Figure 9:
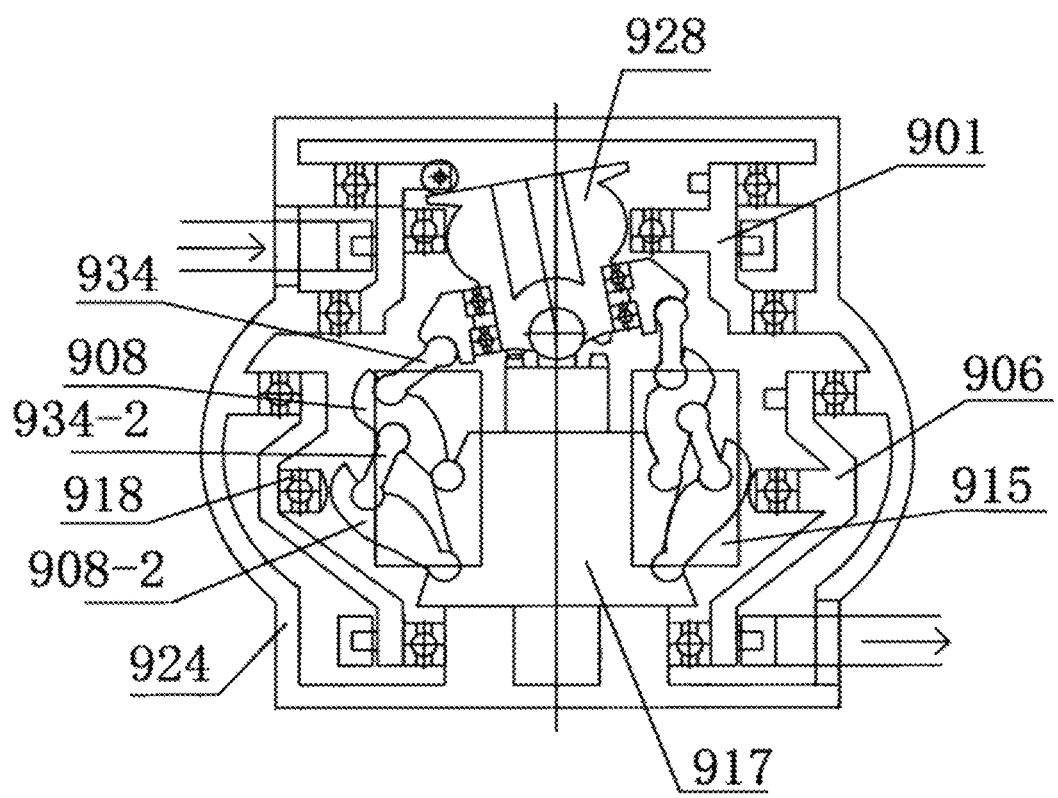

FIG. 9 is a schematic structural diagram of the ninth embodiment of the present invention.

FIG. 9-A to FIG. 9-D are schematic structural diagrams of the two-stage superposition of the lever arm group of the circumferential lever booster based on the eighth embodiment of the present invention.

Of which, FIG. 9-A is a schematic structural diagram of the first-stage lever arm group and the second-stage lever arm group used together in the present invention.

Of which, FIG. 9-B is a schematic diagram of the structural position of a second-stage lever body assembly in the present invention.

Of which, FIG. 9-C is a schematic structural diagram of a swinging body assembly in the present invention.

Of which, FIG. 9-D is a schematic structural diagram of the combination of a guide groove disc and a circumferential support seat in the present invention.

Figure 10:
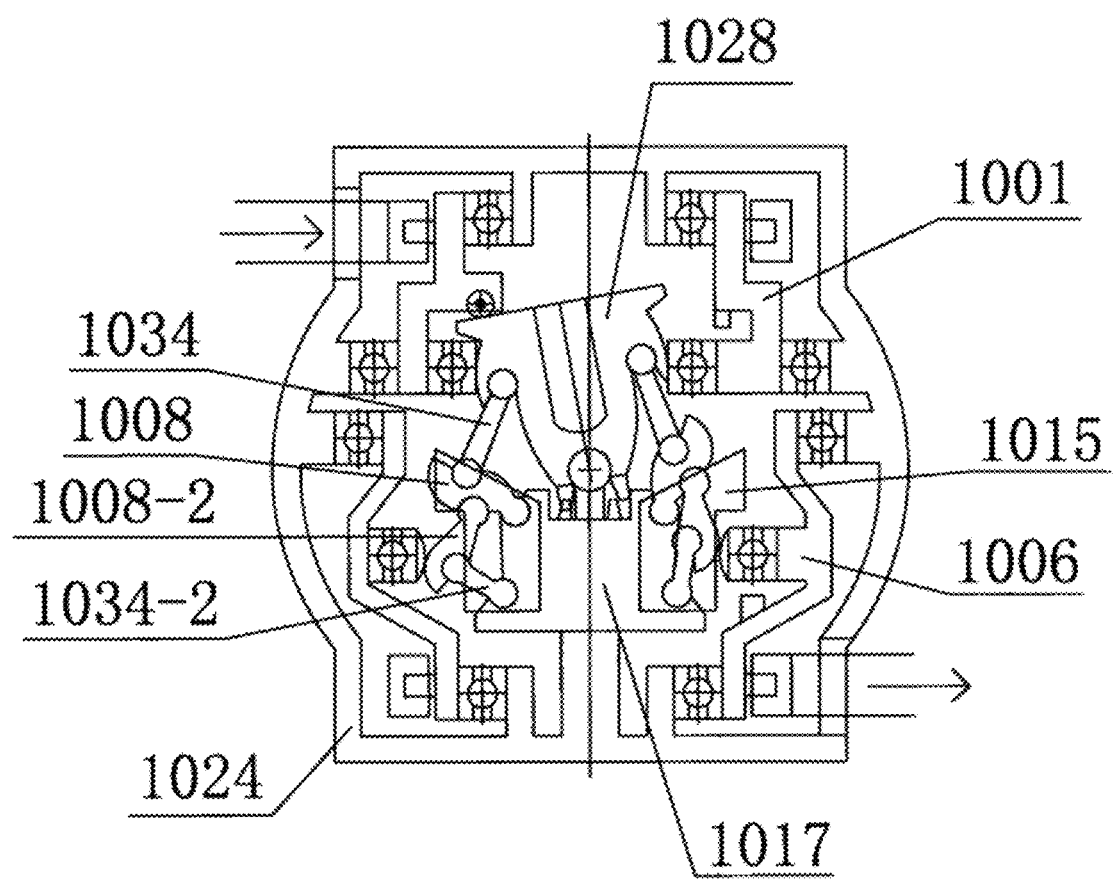

FIG. 10 is a schematic structural diagram of the tenth embodiment of the present invention, showing the boosting of another second-stage lever arm based on the ninth embodiment.

Of which, FIG. 10-A is a schematic structural diagram of a second-stage lever assembly in this embodiment.

Of which, FIG. 10-B is a schematic structural diagram of spherical pits of a swinging body in this embodiment.

Figure 11:
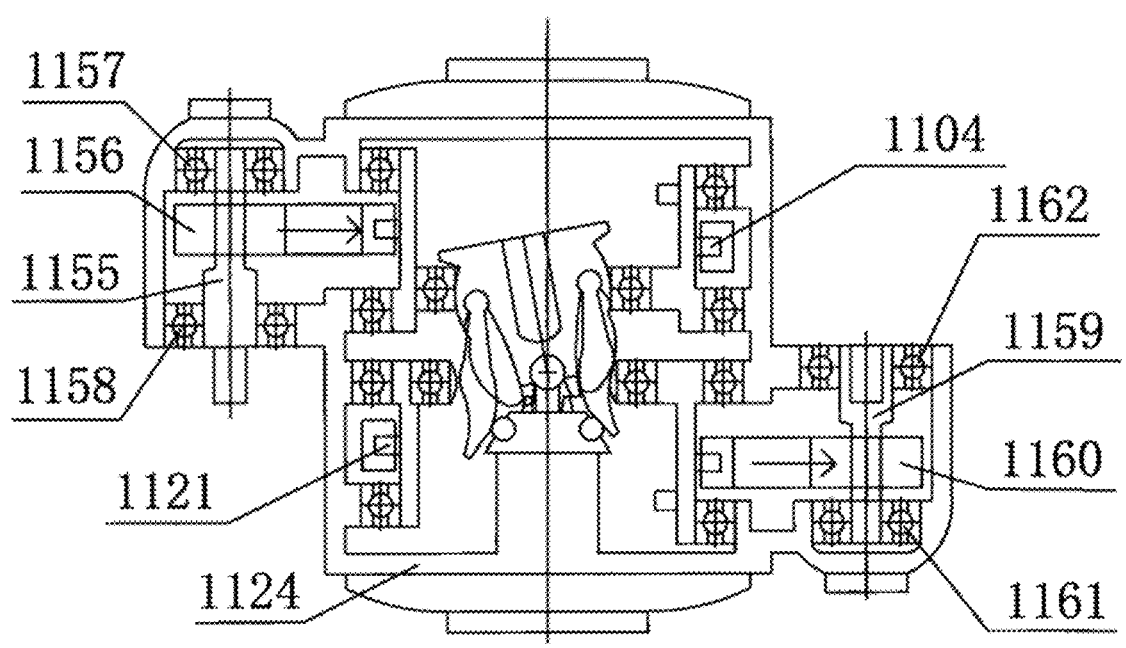

FIG. 11 and FIG. 11-A are schematic structural diagrams of the eleventh embodiment of the present invention, mainly illustrating the input and output transmission structures externally connected to the circumferential lever booster of the present invention.

Of which, FIG. 11-A is a schematic structural diagram of the application of externally connected vertical type series transmission.

Figure 12:
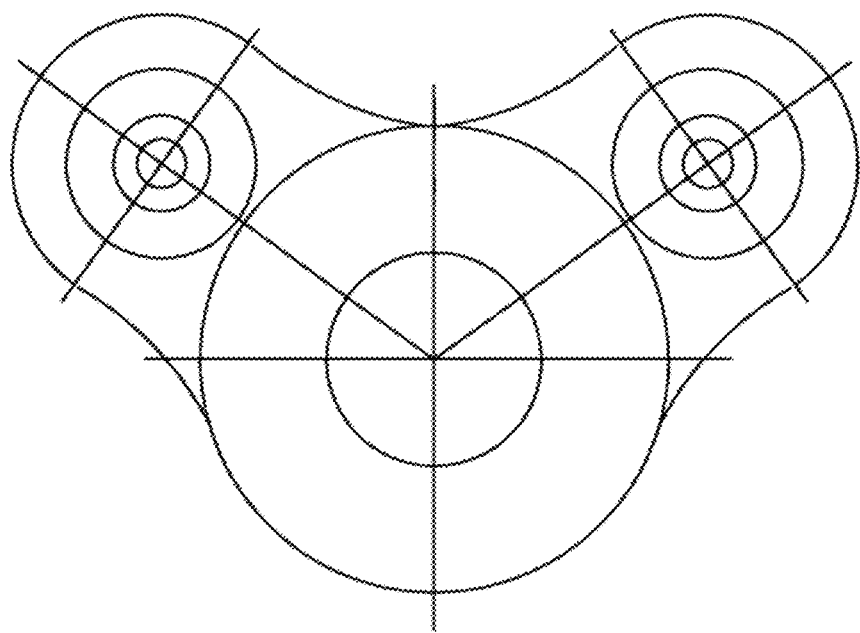

FIG. 12 is a schematic structural diagram of the twelfth embodiment of the present invention, mainly showing the front view of a single machine horizontal application of the circumferential lever booster of the present invention.

FIG. 12-A is a schematic diagram of the structural position of a horizontal type single machine of FIG. 12 when used in multi-machine series transmission.

DETAILED DESCRIPTION

The examples of the present invention will be described in detail below in conjunction with accompanying drawings. The technical solutions of the present invention provide a design idea for a mechanical transmission boosting solution based on the lever principle. Its form is novel and its structure is unique. However, the description of the examples of the present invention is only exemplary, and does not describe all feasible embodiments. Furthermore, with the current development of science and technology and the popularization and application of scientific research information and in combination with the revelation of the technical solutions of the present invention, more examples can be developed and derived continuously. However, various examples based on the technical principles and structural features disclosed in the present invention shall fall within the scope of protection claimed in the appended claims of the present invention.

FIG. 1 to FIG. 1-C are schematic structural diagrams illustrating the first specific embodiment of the circumferential lever booster according to the present invention.

According to the technical solution of the present invention, a basic transmission structure is divided into three parts: an acting force input mechanism, a circumferential lever boosting mechanism and a boost output mechanism.

The acting force input mechanism is provided with an input transmission part 104, and the input transmission part 104 is fixedly connected to an input eccentric wheel 101 of the circumferential lever boosting mechanism and is used for transmitting and inputting external acting force; the input eccentric wheel 101 is positioned through the central axis of a machine body, and is fixedly connected to a machine body shell 124 by means of a bearing 102 and a bearing 103; and in this solution, preferably, the input eccentric wheel 101 is provided with a balance component 119 for balancing the eccentric circumferential rotation motion of the input eccentric wheel.

The circumferential lever boosting mechanism is provided with a lever arm group 109, and the lever arm group 109 is formed by uniformly distributing a plurality of lever arms 108 circumferentially; one end of each lever arm 108 is movably connected with a bearing 105 fixedly connected to the eccentric axis of the input eccentric wheel 101; and the connection position is an actual acting force point of the lever arm group 109 in this embodiment. In this embodiment, preferably, a concave circular step surface 111 is arranged on the bearing 105 on a movable connection face of the input eccentric wheel 101 and the circumferential surface 107 of an input lever arm group, as shown in FIG. 1 and FIG. 1-A. The other end of each lever arm 108 is movably supported with a circumferential support seat 117; the circumferential support seat 117 is positioned through the central axis of the machine body, and is fixedly connected to the machine body shell 124; and the movable supporting position is an actual movable fulcrum of the lever arm group 109 in this embodiment. The circumferential surface 110 of an output lever arm group on the lever arm group 109 is movably connected with a bearing 118 fixedly connected to the eccentric axis of an output eccentric wheel 106; and the movable connecting position is an actual load force point of the lever arm group 109. In this embodiment, preferably, a reinforcing bush is fixed on the movable connection face of the bearing 118 and the circumferential surface 110 of the lever arm group; and the reinforcing bush and the bearing 118 can be integrally machined, and can also be assembled after being machined in a split manner.

The boost output mechanism is provided with an output transmission part 121, and the output transmission part 121 is fixedly connected to the output eccentric wheel 106; the output eccentric wheel 106 is positioned through the central axis of the machine body, and is fixedly connected to the machine body shell 124 by means of a bearing 113 and a bearing 114; and in this solution, preferably, the output eccentric wheel 106 is also provided with a balance component 120 for balancing the eccentric circumferential rotation motion of the output eccentric wheel.

In this embodiment, preferably, a guide groove disc 115 is positioned through the central axis of the machine body, is fixedly connected to the machine body shell and is used to position and protect the motion tracks of the lever arms 108, as shown in FIG. 1-B and FIG. 1-C. The guide grooves 116 on the guide groove disc 115 are equal to the lever arms 108 in number, and are circumferentially, uniformly and movably arranged mounted in a one-to-one correspondence mode. The guide groove disc 115 and the circumferential support seat 117 can be integrally machined, or combined after being machined in a split manner.

In this embodiment, an acting force input end and a boost output end are respectively provided with an input opening 122 and an output opening 123 on the shell wall of the machine body shell 124; and the input opening 122 and the output opening 123 are respectively used for allowing transmission parts such as belts, chains and gears on the input transmission part 104 and the output transmission part 121 to be mounted and penetrate through correspondingly. The input opening 122 and the output opening 123 can be respectively arranged at any position for effective serial connection on the circumference of the machine body shell according to needs.

In this embodiment, the transmission mode of the circumferential lever booster is that: an acting force is transmitted through the input transmission part 104 and the input eccentric wheel 101 fixedly connected to the input transmission part, and meanwhile, the acting force acts on the circumferential surface 107 of the input lever arm group on the lever arm group 109 movably connected with the input eccentric wheel by means of the bearing 105 fixedly connected to the eccentric axis of the input eccentric wheel 101, then the lever arm group 109 is circumferentially pried to do circumferential swinging and axial reciprocating motion with the movable supporting position between the other end of the lever arm group and the circumferential support seat 117 as the fulcrum; and meanwhile, the output eccentric wheel 106 is driven to rotate through the bearing 118 fixedly connected to the eccentric axis of the output eccentric wheel 106 movably connected with the circumferential surface 110 of the output lever arm group, and then the output transmission part 121 on the output eccentric wheel 106 is driven to output a boost.

In this embodiment, a boosting method of the circumferential lever booster is that: circumferential rotation eccentric acting force generated by rotation of the input eccentric wheel 101 is used for driving the lever arm group 109 movably connected with the bearing 105 to do circumferential swinging and axial reciprocating motion through the bearing 105 fixedly connected to the lever arm group by taking the movable supporting position of the other end of the lever arm group and the circumferential support seat 117 as the fulcrum; and then the circumferential surface 110 of the lever arm group is pushed, rotated and pried to act on the bearing 118 fixedly connected to the output eccentric wheel 106, and the output eccentricity is effectively compensated to generate output boost. Particularly, when the fulcrum of the lever arm group 109 and the load force point are arranged at relatively close positions, the prying force can be increased; and meanwhile, the load force from the direction of the output eccentric wheel is effectively blocked, so that self-locking and retaining functions are achieved, and the boost is further improved.

Generally, in order to improve the boost through the circumferential lever force method, the eccentricity of the input end needs to be larger than that of the load force end, and therefore the load force on the output eccentric wheel is increased. According to this solution, the mechanical structure design is reasonable and ingenious, radial acting force inputted into the eccentric wheel is converted and decomposed into resultant force of circumferential swinging and axial prying force through the movable lever arm, and the eccentricity is effectively compensated for. Therefore, under a condition that the eccentricity inputted into the eccentric wheel is relatively smaller than or equal to that of the output eccentric wheel, boost can be improved, the self-locking function is achieved.

FIG. 2 to FIG. 2-E are schematic structural diagrams illustrating the second specific embodiment of the circumferential lever booster according to the present invention.

On the basis of the Embodiment 1 (namely, the integral transmission structure according to the technical solution of the present invention is divided into three parts: the acting force input mechanism, the circumferential lever boosting mechanism and the boost output mechanism. The acting force input mechanism is provided with an input transmission part 204, and the transmission part 204 is fixedly connected to an input eccentric wheel 201 of the circumferential lever boosting mechanism, and is used for transmitting and inputting an external acting force; the input eccentric wheel 201 is positioned through the central axis of the machine body, and is fixedly connected to a machine body shell 224 by means of a bearing 202 and a bearing 203; and preferably, the input eccentric wheel 201 is provided with a balance component 219 for balancing the eccentric circumferential rotation motion of the input eccentric wheel. The circumferential lever boosting mechanism is provided with a lever arm group 209, and the lever arm group 209 is formed by uniformly distributing a plurality of lever arms 208 circumferentially; one end of each lever arm 208 is movably supported with a circumferential support seat 217; the circumferential support seat 217 is positioned through the central axis of the machine body, and is fixedly connected to the machine body shell 224; and each lever arm 208 is preferably provided with a guide groove disc to position and protect the moving tracks of the lever arms 208. The guide groove disc is positioned through the central axis of the machine body, and is fixedly connected to the machine body shell. Guide grooves on the guide groove disc are equal to the lever arms 208 in number, and are circumferentially and uniformly distributed and mounted in a one-to-one correspondence mode. A circumferential surface 210 of an output lever arm group on the lever arm group 209 is movably contacted with a bearing 218 fixedly connected to the eccentric axis of an output eccentric wheel 206; the boost output mechanism is provided with an output transmission part 221, and the output transmission part 221 is fixedly connected to an output eccentric wheel 206; the output eccentric wheel 206 is positioned through the central axis of the machine body, and is fixedly connected to the machine body shell 224 by means of a bearing 213 and a bearing 214; and preferably, the output eccentric wheel 206 is also provided with a balance component 220 for balancing the eccentric circumferential rotation motion of the output eccentric wheel.) According to this embodiment, preferably, the lever arm group 209 is designed to be movably connected with a bearing 205 fixedly connected to the input eccentric wheel 201 by means of a swinging body 228. That is, the other end of the lever arm of the lever arm group 209 is movably connected with the swinging body 228.

Specifically, the circumferential surface 207 of the input lever arm on one end of the lever arm group 209 is positioned through the central axis of the swinging body 228, and is movably connected with the swinging body; the movable connecting position is the load force point of the swinging body 228 in this embodiment. One end of the swinging body 228 is fixedly connected to a universal fulcrum 229; the connection position is the fulcrum of the swinging body 228 in this embodiment; the universal fulcrum 229 is positioned through the central axis of the machine body, and is fixedly connected to the machine body shell 224 through the support seat 217; the other end of the swinging body 228 is movably connected with the bearing 205 fixedly connected to the eccentric axis of the input eccentric wheel 201; and the connection position is the acting force point of the swinging body 228 in this embodiment. In the overall concept of this embodiment, the swinging body 228 is designed to realize swinging motion in the circumference without generating autorotation, so that the effect of lever prying force is effectively exerted. Therefore, a circumferential swinging positioning mechanism is required to be arranged for the swinging body 228 to meet the specific mechanical efficiency. In this embodiment, preferably, the swinging body 228 is positioned through the central axis of the swinging body 228, and is fixedly connected to positioning teeth 230; the positioning teeth 230 and positioning teeth 231 positioned through the central axis of the machine body and fixedly connected to the support seat 217 do swinging meshing motion to finish the circumferential swinging positioning motion of the swinging body 228 together, as shown in FIG. 2-A; and definitely, other equivalent positioning modes can be adopted.

In this embodiment, the lever arm group 209 composed of the swinging body 228 and the plurality of lever arms 208 forms a lever body assembly 245, as shown in FIG. 2-E. Therefore, the movable supporting position of the lever arms 208 and the support seat 217 is the actual acting force fulcrum of the lever body assembly 245. The movable connecting position of the lever arms 208 and the swinging body 228, namely the load force point of the swinging body 228, is the actual acting force point of the lever body assembly 245. The movable connecting position of the circumferential surface 210 of the output lever arm group and the bearing 218 fixedly connected to the output eccentric wheel 206 is the actual load force point of the lever body assembly 245.

In this embodiment, preferably, guide grooves 216 are circumferentially and uniformly distributed in the swinging body 228 through the central axis of the swinging body 228, and are used to position and protect the moving tracks of the lever arms 208, as shown in FIG. 2-B. The guide grooves 216 are equal to the lever arms 208 in number, and the guide grooves correspond to the lever arms one by one. The guide grooves 216 and the swinging body 228 can be integrally machined, or can be combined after being machined in a split manner.

In this embodiment, preferably, the input eccentric wheel 201 is fixedly connected to a pressure roller 225, and the pressure roller 225 is in a movable contact with one end surface of the swinging body 228 to increase the circumferential lever prying force of the swinging body 228. The pressure roller 225 can also adopt other equivalent forms.

In this embodiment, preferably, supporting rolling parts 226 are connected to the circumferential supporting surface of the support seat 217. The supporting rolling parts 226 correspond to the lever arms 208 in a one-to-one mode and are circumferentially and uniformly distributed to form a supporting rolling part group 233, as shown in FIG. 2-D, which can effectively improve the transmission performance.

FIG. 3 to FIG. 3-E show schematic structural diagrams illustrating the third specific embodiment of the circumferential lever booster according to the present invention.

This embodiment is different from the foregoing second embodiment in that one end of the plurality of lever arms 308 is positioned through a central axis of a machine body and movably connected to the concave circular step surfaces 335 on the circumferential support seat 317, and are circumferentially and uniformly distributed, as shown in FIG. 3-C. The other end of the lever arm 308 is movably supported with the swinging body 328. In this embodiment, the lever arm group 309 composed of a plurality of lever arms 308 and the swinging body 328 still form a lever body assembly 345 after being separated, as shown in FIG. 3-A. The location where the lever arm 308 is movably supported with the swinging body 328 is the actual force point of the lever body assembly 345; and location where the lever arm 308 is movably supported with the circumferential support seat 317 is the actual force fulcrum of the lever body assembly 345. The movable connection between the circumferential surface 310 of the lever arm group on the lever arm group 309 and the bearing 318 on the eccentric axis of the output eccentric wheel 306 is the location where the actual load force point of the lever body assembly 345 is located. In this embodiment, preferably, the support seat 317 is positioned through the central axis of the machine body, and is fixedly connected to a guide groove disc 315 to position and protect the movement track of the lever arms 308, as shown in FIG. 3-C. The guide grooves on the guide groove disc 315 are equal to the lever arms 308 in number and are circumferentially and uniformly distributed in a one-to-one correspondence mode. The guide groove disc 315 and the support seat 317 can also be integrally machined. In this embodiment, preferably, rollers 348 capable of circumferential sliding are uniformly disposed on the circumferential surface of the swinging body 328 that is movably supported with one end of the lever arm 308, the rollers 348 slide with the lever arm 308 in one-to-one correspondence mode to form a roller group 349 on the circumferential surface of the swinging body 328, as shown in FIG. 3-B, thereby improving the moving performance more effectively.

In this embodiment, the swinging positioning mechanism of the swinging body 328 is arranged on the universal fulcrum 329 connected thereto, that is, a universal fulcrum positioning post 346 is provided for sliding positioning in the universal fulcrum positioning groove 347, thereby forming a set of positioning components that are mutually meshed and can slide, as shown in FIG. 3-D and FIG. 3-E, to optimize the mechanical structure.

In this embodiment, when the guide groove disc 315 is not enough to fully protect the lever arm 308, preferably, an additional guide groove disc can be added to compensate for the protection, as shown in FIG. 3.

FIG. 4 shows a schematic structural diagram illustrating the fourth specific embodiment of the circumferential lever booster according to the present invention.

In this embodiment, based on the previous embodiment, another lever arm boosting structural form is derived.

In this embodiment, the supporting force end of the lever arm 408 is designed as a spherical movable joint 442, and is movably connected to the circumferential support seat 417 and circumferentially and uniformly distributed; near the end of the lever arm 408, a short arm 440 is transversely and fixedly connected, and on the other acting force end of the lever arm 408, a long arm 439 is transversely and fixedly connected; the lengths of the short arm 440 and the long arm 439 are multiples, as shown in FIG. 4-A. The distance from the fixed connection position of the short arm 440 and the long arm 439 to the supporting spherical joint 442 of the lever arm 408 is also a multiple. Meanwhile, the short arm 440 and the long arm 439 are fixed at an angle to their circumferential positions on the lever arm 408, as shown in FIG. 4-B.

The acting force ends of the lever arm group 409 composed of the lever arm 408 are positioned in the guide grooves 416 on the swinging body 428 in one-to-one correspondence mode by circumferential uniform distribution method and are movably connected. The position of the lever arm 408 at the movable connection between the guide grooves 416 and the lever arms 408 is provided with a spherical body 441 to assist, as shown in FIG. 4-A and FIG. 4-C. In FIG. 4-C, there is also a pressure roller 425. The pressure roller 425 is fixed and eccentrically connected to the input eccentric wheel 401, and rotates with the rotation of the input eccentric wheel 401. At the same time, the pressure roller 425 drives the lever arms 408 in the guide grooves 416 uniformly distributed on the swinging body 428 to make a circular swing motion. While rotating, the input eccentric wheel 401 also drives an eccentric driving component 443 fixedly connected thereto to rotate circumferentially, thereby driving the long arm 439 fixed on the lever arm 408 to rotate with the supporting spherical joint 442 as the fulcrum, and thus implementing the rotation boosting of the short arm 440 fixed arranged on the lever arm 408 and compensating for the lack of input eccentricity. As shown in FIG. 4-D, it is a schematic structural diagram showing the relationship between the relative swing displacement of the pressure roller 425 and the lever arm 408 in the guide grooves 416 of the swinging body 428. Among them, FIG. 4-E and FIG. 4-F show the basic structure and position of the swinging body 428 and guide grooves 416.

In the embodiments, the circumferential force generated by the overall linkage of the lever arm 408 combined with the swinging body 428 and the input eccentric wheel 401 is a multi-directional three-dimensional comprehensive force, which jointly acts on the reversal force in the direction of the load force, making full use of the design intention and effect of the cluster's circumferential prying power.

FIG. 5 shows a schematic structural diagram illustrating the fifth specific embodiment of the circumferential lever booster according to the present invention.

In this embodiment, based on the second embodiment, preferably, the bearing 518 on the output eccentric wheel 506 is mounted obliquely. That is, the two axes on the output eccentric wheel are at an angle. Without changing the eccentricity of the input eccentric wheel 501 and the output eccentric wheel 506, the distance between the actual load force point (the movable connection between the circumferential surface 510 of the lever arm group and the fixedly connected bearing 518 on the output eccentric wheel 506 eccentric axis) and the fulcrum (the movable supporting surface of the supporting rolling part group 533 composed of the supporting rolling parts 526 on the lever arm group 509 and the circumferential support seat 517) in the lever body assembly 545 in this scheme is shortened, the ratio of the power arm to the resistance arm is increased, which can improve the boosting effect of the circumferential lever boosting mechanism.

FIG. 6 to FIG. 6-D show schematic structural diagrams illustrating the sixth specific embodiment of the circumferential lever booster according to the technical solutions of the present invention.

In this embodiment, a supporting rod 634 is movably connected between the lever arm 608 and the movable support end of the circumferential support seat 617, as shown in FIG. 6-A. This optimization solution is another implementable form of movable connection between the lever arm and the circumferential support seat in the circumferential lever booster of the present invention.

Specifically, as shown in FIG. 6-A, one end of the supporting rod 634 is positioned through the central axis of the machine body and is flexibly connected to the circumferential support seat 617, and circumferentially and uniformly distributed; in this embodiment, preferably, the circumferential support seat 617 is provided with concave circular step surfaces 635 at the circumferential surface that is movably connected to the supporting rod 634. The other end of the supporting rod 634 is movably connected to one end of the lever arm 608; in this embodiment, preferably, the lever arm 608 is provided with a concave pit 636 at the end that is movably connected to the supporting rod 634. The other end of the lever arm 608 is movably supported with the swinging body 628.

In this embodiment, the lever arm group 609 composed of the lever arm 608 and the supporting rod 634 and the swinging body 628 together constitute the lever body assembly 645, as shown in FIG. 6-A. The point that the lever arm 608 is movably supported with the swinging body 628 is the actual force point of the lever body assembly 645; and the movable connection between the supporting rod 634 and the circumferential support seat 617 is the actual fulcrum of the lever body assembly 645. The movable connection between the circumferential surface 610 of the output lever arm group formed by the lever arm group 609 and the bearing 618 on the eccentric axis of the output eccentric wheel 606 is the actual load force point of the lever body assembly 645. The specific process sequence of implementing the force is as follows: when a force drives the input eccentric wheel 601 through the input transmission part 604, then drives the swinging body 628 by means of a bearing 605 to perform a circular positioning swing using the universal fulcrum 629 as the fulcrum, as shown in FIG. 6-B, and then acts on the point that the lever arm 608 is movably supported with the swinging body 628, and pries the lever arm 608, and using the movable connection between the supporting rod 634 and the circumferential support seat 617 as a fulcrum, the circumferential surface 610 of the output lever arm group formed by the lever arm group 609 is movably connected to the bearing 618 on the eccentric axis of the output eccentric wheel 606 to form a pushing force, thereby driving the output eccentric wheel 606 and the output transmission part 621 to rotate and output a boost.

In this embodiment, preferably, a guide groove disc 615 is positioned through the central axis of the machine body and is fixedly connected to the circumferential support seat 617 and the machine body shell 624. The guide grooves 616 on the guide groove disc 615 are circumferentially and uniformly distributed with the lever arms 608 and the supporting rods 634 in a one-to-one correspondence mode, and meanwhile, position and protect the movement track of the lever arms 608 and the supporting rods 634, as shown in FIG. 6-C and FIG. 6-D.

Unlike the previous embodiment in which the input and output external openings are provided on the circumferential wall of the machine body shell for the acting force input and boosting output, in this embodiment, the acting force input and boosting output are set as shaft end output and input. That is, the input eccentric wheel 601 is fixedly connected to an input shaft 637 with the central axis of the machine body as the positioning. The input shaft 637 is fixedly connected to the machine body shell 624 by means of a bearing 603; the input shaft is fixedly connected to the input transmission part 604. Similarly, the output eccentric wheel 606 is fixedly connected to an output shaft 638 with the central axis of the machine body as the positioning, and the output shaft 638 is fixedly connected to the machine body shell 624 by means of a bearing 614; the output shaft is fixedly connected to the output transmission part 621.

FIG. 7 to FIG. 7-D show schematic structural diagrams illustrating the seventh specific embodiment of the circumferential lever booster according to the present invention. This embodiment is based on the basic structure and principle disclosed in the sixth embodiment, and the swinging body acts on another structural connection and positional relationship equivalent of the lever arm.

In this embodiment, one end of the lever arm 708 is positioned with the central axis of the swinging body 728 and is movably connected to the swinging body 728, and circumferentially and uniformly distributed; the other end of the lever arm 708 is movably connected to one end of the supporting rod 734, as shown in FIG. 7-A; the other end of the supporting rod 734 is movably supported with the circumferential support seat 717. In this embodiment, preferably, a concave circular surface 750 is provided on the circumferential surface at the location where the circumferential support seat 717 is movably supported with the supporting rod 734, as shown in FIG. 7-B.

In this embodiment, the lever arm group 709 composed of the lever arm 708 and the supporting rod 734 and the swinging body 728 together constitute the lever body assembly 745, as shown in FIG. 7-D. The movable connection between the lever arm 708 and the swinging body 728 is the actual force point of the lever body assembly 745; and the location whether the supporting rod 734 is movably supported with the circumferential support seat 717 is the actual fulcrum of the lever body assembly 745. The movable connection between the circumferential surface 710 of the lever arm group formed by the lever arm group 709, as shown in FIG. 7-C, and the bearing 718 on the eccentric axis of the output eccentric wheel 706 is the actual load force point of the lever body assembly 745.

FIG. 8 to FIG. 8-C show schematic structural diagrams illustrating the eighth specific embodiment of the circumferential lever booster according to the present invention. The difference from the seventh embodiment is that the lever arm 808 of this embodiment is applied in an inverted manner.

In this embodiment, preferably, when the guide groove disc 815 is not enough to effectively protect the supporting rod 834, double-side protection skirts 851 are added to the lever arm 808 to compensate for the protection, as shown in FIG. 8-A and FIG. 8-C. FIG. 8-B shows the lever body assembly 845.

FIG. 9 to FIG. 9-D show schematic structural diagrams illustrating the ninth specific embodiment of the circumferential lever booster according to the present invention.

Based on the above eighth embodiment, in this embodiment, the lever arm group 909 composed of a plurality of lever arms 908 can also be used in a multi-stage connection mode. The lever arm group 909-2 for multi-stage connection a second stage lever action form of the circumferential lever boosting mechanism in the present invention.

Specifically, as shown in FIG. 9-A and FIG. 9-B, one end of the lever arm 908-2 is movably connected to one end of the supporting rod 934-2, which are jointly circumferentially and uniformly distributed and constitute a lever arm group 909-2; the other end of arm 908-2 is positioned with the central axis of the machine body and is movably connected to the circumferential support seat 917, and is circumferentially and uniformly distributed; the other end of the supporting rod 934-2 is movably connected to lever arm 908. In this embodiment, the lever arm group 909, lever arm group 909-2 and swinging body 928 together constitute the lever body assembly 945, as shown in FIG. 9-B. The location where the supporting rod 934 is movably supported with the swinging body 928 is the actual force point of the lever body assembly 945; and the movable connection between the lever arm 908-2 and the circumferential support seat 917 is the actual fulcrum of the lever body assembly 945. The movable connection between the circumferential surface 910 of the lever arm group on the lever arm group 909-2 and the bearing 918 fixed on the eccentric axis of the output eccentric wheel 906 is the actual load force point of the lever body assembly 945.

In this embodiment, preferably, when the concave circular step surfaces 950 are machined in a split manner, concave circular step parts 952 thereof are connected to the swinging body 928 in a positioning and matched manner by means of a bearing 953, as shown in FIG. 9-C, so that the force transmission friction effect of the supporting rod 934 in movable contact with them are enhanced and improved.

In this embodiment, in order to effectively protect the movement of the multi-stage lever arm, a guide groove disc 915 is fixedly connected to the circumferential support seat 917. The circumferential support seat 917 is provided with two concave circular step surfaces 935 and 935-2 respectively, which are used for the movable connection of the lever arm 908 and 908-2, as shown in FIG. 9-D.

In this embodiment, due to the two-stage combination of the lever arm group 909 and the lever arm group 909-2, the boost output by the circumferential lever boosting mechanism of the present invention is further doubled. Apparently, on the basis of the basic principles disclosed in this embodiment, the lever arm group can also be used in a multi-stage mode depending on the possibility and needs of actual application mechanical performance, thereby a greater output boost is achieved.

FIG. 10 to FIG. 10-B show schematic structural diagrams illustrating the tenth specific embodiment of the circumferential lever booster according to the present invention.

This embodiment is one of the equivalent structural evolution forms based on the ninth specific embodiment.

In this embodiment, preferably, the two ends of the supporting rod 1034 on the lever arm 1008 in the first-stage lever arm group 1009 are designed in a ball joint mode, one end of which is movably connected to the swinging body 1028, and the other end is movably connected to one end of the lever arm 1008, as shown in FIG. 10-A. The movable connection between the swinging body 1028 and the supporting rod 1034 is provided with spherical pits 1054, as shown in FIG. 10-B. The spherical pits 1054 are circumferentially and uniformly distributed on the swinging body 1028 with the supporting rods 1034 that are movably connected to the lever arms 1008 in a one-to-one correspondence mode. The other end of the lever arms 1008 is movably supported with the circumferential support seat 1017.

In this embodiment, the application principle of the two-stage levers is the same as that of the ninth embodiment, and will not be described again here. When both ends of the supporting rod 1034 are designed in a ball joint mode, the only difference is that the supporting rod 1034 will produce corresponding follow-up swing amplitude along with the circumferential swing of the swinging body 1028, and the mechanical effect thereof is the other form same as the foregoing solutions. Other equivalent forms may also be used.

FIG. 11 and FIG. 11-A show a schematic structural diagram showing the eleventh specific embodiment of the circumferential lever booster according to the present invention, which mainly describes a structural form of external transmission links.

In this embodiment, preferably, the input and output connecting shafts are added to effectively implement a structural form of rapid and effective multi-machine series transmission, as shown in FIG. 11.

Specifically, a transmission shaft 1155 is provided and mounted on the inner wall of the machine body shell 1124 by means of a bearing 1157 and a bearing 1158; the transmission shaft 1155 is fixedly connected to an external input transmission part 1156; the external input transmission part 1156 is linked to the input transmission part 1104 in the machine by means of a transmission belt/a chain etc. Another transmission shaft 1159 is mounted on the other end of the inner wall of the machine body shell 1124 connector by means of a bearing 1161 and bearing 1162; the transmission shaft 1159 is fixedly connected to an external output transmission part 1160; the external output transmission part 1160 is linked to the transmission part 1121 in the machine body by means of a transmission belt/a chain etc. Thus, an integral series structure can be formed.

There are multiple structural forms that can form an integral series transmission. This is just an example.

FIG. 11-A is a schematic structural diagram of a vertical type series transmission of FIG. 11. It is one of the vertical type application layout forms of the circumferential lever booster of the present invention that is completely presented based on the foregoing embodiments in the form of a single-machine series transmission structure. The series form has a compact structure and is easy to form large-scale and integrated applications.

Based on the common knowledge of those skilled in the art, apparently, when the circumferential lever booster of the present invention is used in multi-machine series transmission, a machine body shell can be shared, thereby direct series transmission in the machine body is performed to achieve a more intensive and compact mechanical structure design form.

FIG. 12 and FIG. 12-A show the twelfth specific embodiment of the circumferential lever booster according to the present invention; the schematic structural diagram of the single-machine horizontal application and the multi-machine horizontal series transmission application of the present invention are mainly presented.

FIG. 12 is a schematic structural diagram of the appearance of the circumferential lever booster of the present invention when used in single-machine horizontal application. FIG. 12-A is a schematic structural diagram of a multi-machine series transmission application based on single-machine horizontal application in FIG. 12. Of course, this embodiment is only a schematic presentation. Based on the common knowledge of those skilled in the art and on the premise of complying with the mechanical principles of the present invention, more possible structural layout designs can be made depending on the actual needs.

This embodiment is one of the possible layouts for horizontal application in the single-machine serial transmission structure of the circumferential lever booster of the present invention, which is completely presented based on the above embodiments. One of the advantages of this horizontal application is the reliability of the mechanical lubrication. Because the series transmission shaft is at the upper level of the lubricating oil level, oil leakage can be effectively prevented.

The transmission mode of the circumferential lever booster is that: an acting force is applied to drive the input transmission part and the input eccentric wheel fixedly connected to the input transmission part to rotate, and meanwhile, the bearing fixedly connected to the eccentric axis of the input eccentric wheel acts on one end of the lever arm group which is movably connected to or movably supported with the bearing, so that a resultant force of circumferential swinging and axial prying acts on the lever arm group in a pushing and rotating mode, and then the lever arm group is promoted to do circumferential swinging and axial reciprocating motion with the movable supporting or movable connecting position between the other end of the lever arm group and the support seat as the fulcrum; and meanwhile, the bearing fixedly connected to the eccentric axis of the output eccentric wheel movably connected to the circumferential surface of the output lever arm group is used for driving the output eccentric wheel to rotate, and then the output transmission part on the output eccentric wheel is driven to output a boost.

In the present invention, preferably, the lever arm group can be movably connected to or movably supported with the bearing fixedly connected to the eccentric axis of the input eccentric wheel by means of the swinging body; and one end of the swinging body is connected to the universal fulcrum fixed to the central axis of a machine body, and the other end of the swinging body is movably connected to the bearing fixedly connected to the eccentric axis of the input eccentric wheel.

Further, in the present invention, the lever arms can be used in a multi-stage mode, such that the lever arms are movably connected to the circumferential surface of the lever arm group formed by the lever arm group used in the multi-stage mode to push the bearing on the eccentric axis of an output eccentric wheel to rotate, the output eccentric wheel is driven to rotate, and then boost is output.

A boosting method of the circumferential lever booster of the present invention is that circumferential rotation eccentric acting force generated by rotation of the input eccentric wheel is used for driving the lever arm group to do circumferential swinging and axial reciprocating motion with the circumferential support position at one end as the fulcrum, thus the output eccentricity is effectively compensated while the circumferential surface of the lever arm group is pushed, rotated and pried to act on load force on the output eccentric wheel, and therefore output boost is generated and transmitted.

In the present invention, preferably, the fulcrums and load force points of the lever arm groups are arranged at the close positions, so that the prying force is increased, meanwhile, the load force from the direction of the output eccentric wheel is effectively blocked, the self-locking and retaining functions are achieved, and boosting is further improved.

The boosting method of the circumferential lever booster of the present invention:

The technical solution changes the understanding of the lever arm as a single lever arm in the prior art, and multiple lever arms are combined circumferentially into the lever arm group to achieve overall linkage so as to achieve prying force of levers.

The technical solution changes the method that the fulcrum of the lever force is a fixed fulcrum at the center of a circle in the prior art, and the lever force fulcrum is designed to be a movable fulcrum on the circumference to achieve boosting.

The technical solution uses an eccentric wheel as the transmission mechanism for inputting and outputting acting forces and load forces, and boosting is achieved through a method that the acting force of the input end is increased by reducing the eccentricity of the input eccentric wheel and meanwhile applying the lever arms and bearing rods. This changes the normal state in the prior art that the eccentricity of the input end of the circumferential lever force is multiple times larger than the eccentricity of the output end, but the acting force at the input end is actually lost.

The technical solution changes the direction of the force at the input end, that is, a plane circumferential radial rotation force of the eccentric wheel at the input end is changed into an acting force tending to the axial direction, and therefore reverse rotation force from the load force direction can be effectively resisted, and boosting is achieved.

The technical solution changes the single rotating extrusion force of the eccentric wheel at the input end, and lever arms are linked to realize the combined action of multiple forces, and boosting is achieved.

The technical solution changes the usage of lever arm as a single lever force in the prior art, and the boosting is improved by additionally arranging transverse long and short arms on the lever arms.

According to the technical solution, single lever arms are integrated into the multiple lever arms to achieve continuous and circulating prying on the circumference, multiple prying forces accumulated on the circumference are used for achieving continuous and overall circumferential circulating prying force, and therefore boosting is achieved.

The technical solution adopts a lever body assembly method, and the lever arm groups are movably connected to the swinging body to effectively improve output torque force.

According to the technical solution, multiple-grade lever arm groups are stacked and connected to achieve boosting.

According to the technical solution, multiple single machines are effectively combined and connected in series for transmission, and therefore larger output torque force is improved.

The greatest feature of the circumferential lever booster of the present invention for its mechanical use is that: multiple machines can form a series connection for transmission and combined application, and a geometric-level boosting effect is achieved.

According to the circumferential lever booster shown in specific embodiments 1 to 12, the technical solutions of the present invention can achieve many beneficial technical effects:

the mechanical structure design of the present invention is simple, reasonable and efficient, and the boosting output is achieved only by the transmission of the input eccentric wheel and the output eccentric wheel.

According to the technical solution of the present invention, the circumferential lever booster can conduct forward and reverse circumferential rotation movement or angular reciprocating rotation movement.

According to the technical solution of the present invention, the whole machine has a good self-locking function.

According to the technical solution of the present invention, on the basis of the basic principles revealed by the two-stage lever arm group, the superimposed use of multi-stage lever arm group can be achieved.

According to the technical solution of the present invention, the diameter size of the input transmission part of the acting force input mechanism is designed to be equal to the diameter size of the output transmission part of the boost output mechanism, which facilitates the effective transmission and linkage in series.

According to the technical solution of the present invention, the circumferential lever booster can be used independently or multiple machines can be connected in series for transmission. Apparently, if the circumferential lever boost of a single machine is increased in multiples, the cumulative boost of the circumferential lever of multiple boosters connected in series can increase geometrically.

According to the technical solution of the present invention, the compact mechanical structure and reasonable mechanical performance determine that the boosters are easier to achieve series transmission and can be suitable for more application scenarios. The series application forms are diverse, which can be vertical or horizontal transmission application.

According to the technical solution of the present invention, one machine and one shell can be adopted, or a plurality of circumferential lever boosters are designed to be internally connected in series and share one machine body shell.

The design of the lubrication system is one of the difficulties of the present invention. However, due to the excellent and ingenious mechanical structure design of the present invention, the problem of body lubrication is effectively solved and spillage and leakage are prevented. According to the technical solution of the present invention, the lubrication of the machine body can be self-splashing type or can be externally connected to a lubricating source or a pump station for combined lubrication. When plurality of circumferential lever boosters are applied in a series connection mode, a lubricating system can be shared.

According to the technical solution of the present invention, an individual circumferential lever booster can be miniaturized and lightweight, or can be heavy, large-scale and integrated.

According to the technical solution of the present invention, in a case of a requirement for a light application scene, even-distribution hollow treatment can be conducted on the body components and local unimportant positions.

According to the technical solution of the present invention, the circumferential lever booster can be widely used in mechanical power boosting, kinetic energy reserve, power generation, etc.

According to the technical solution of the present invention, the circumferential lever booster is environmentally-friendly, pollution-free and has low noise.

What is claimed is:

1. A circumferential lever booster, comprising an acting force input mechanism, a circumferential lever boosting mechanism, a boost output mechanism and a machine body shell, wherein:

the acting force input mechanism is provided with an input transmission part that is fixedly connected to an input eccentric wheel; the input eccentric wheel is positioned about a central axis of a machine body, and is fixedly connected to the machine body shell by means of a first bearing;

the circumferential lever boosting mechanism is provided with a lever arm group, and the lever arm group comprises a plurality of lever arms uniformly distributed in a circumferential direction;

a circumferential surface formed at one end of the lever arm group is movably connected to a second bearing fixedly connected to the input eccentric wheel about an eccentric axis of the input eccentric wheel, a circumferential surface formed at another end of the lever arm group is movably supported with a circumferential support seat; or, the circumferential surface formed at the one end of the lever arm group is movably supported with the second bearing fixedly connected to the input eccentric wheel about the eccentric axis of the input eccentric wheel, the circumferential surface formed at the other end of the lever arm group is movably connected to the circumferential support seat;

the circumferential support seat is positioned about the central axis of the machine body, and is fixedly connected to the machine body shell, and a circumferential surface formed at a loading force end of the lever arm group is movably connected to a third bearing fixedly connected to an output eccentric wheel about an eccentric axis of the output eccentric wheel;

the boost output mechanism is provided with an output transmission part which is fixedly connected to the output eccentric wheel, and the output eccentric wheel is positioned about the central axis of the machine body, and is fixedly connected to the machine body shell by means of a fourth bearing.

2. The circumferential lever booster according to claim 1, wherein the lever arms are movably connected to the second bearing on the input eccentric wheel or the circumferential support seat in an embedded manner.

3. The circumferential lever booster according to claim 1, wherein a long arm is transversely and fixedly arranged at an acting force end, close to the input eccentric wheel, of each of the lever arms, and a short arm is arranged at another end, close to the output eccentric wheel, of each of the lever arms; a component is eccentrically arranged and fixedly connected to the input eccentric wheel, so as to drive and push the long arm transversely and fixedly arranged at the acting force end of each of the lever arms to rotate.

4. The circumferential lever booster according to claim 1, wherein the lever arm group is provided with a guide groove disc, and guide grooves in the guide groove disc are in one-to-one correspondence with the lever arms and are uniformly distributed in the circumferential direction, so as to position and protect a movement track of the lever arms.

5. The circumferential lever booster according to claim 1, wherein an eccentricity of the input eccentric wheel is relatively smaller than or equal to that of the output eccentric wheel.

6. The circumferential lever booster according to claim 1, wherein the lever arm group is movably connected to a swinging body, and the swinging body is movably connected to the input eccentric wheel.

7. The circumferential lever booster according to claim 6, wherein one end of the swinging body is connected to a universal fulcrum, and another end of the swinging body is movably connected to the second bearing fixedly connected to the input eccentric wheel about the eccentric axis of the input eccentric wheel; and the universal fulcrum is positioned about the central axis of the machine body, and is fixedly connected to the machine body shell.

8. The circumferential lever booster according to claim 7, wherein guide grooves are formed in the swinging body, the guide grooves are in one-to-one correspondence with the lever arms and are uniformly distributed in the circumferential direction, so as to position and protect a movement track of the lever arms.

9. The circumferential lever booster according to claim 7, wherein a pressure roller is fixedly connected to the input eccentric wheel, and the pressure roller is movably pushed and rotated with the one end of the swinging body and/or one end of each lever arm.

10. The circumferential lever booster according to claim 1, wherein one end of each lever arm is movably connected to one end of a supporting rod, and another end of the supporting rod is movably connected to or movably supported with the second bearing on the input eccentric wheel, the circumferential support seat or a lever arm in another stage.

11. The circumferential lever booster according to claim 1, wherein one end of each lever arm is a ball joint and is movably connected to the second bearing on the input eccentric wheel or a connecting component of the second bearing;
another end of each lever arm is movably connected to the circumferential support seat or a connecting component of the circumferential support seat; or
the other end of each lever arm is movably connected to a corresponding one of the lever arms in different stages or a connecting component of the corresponding one of the lever arms in different stages.

12. The circumferential lever booster according to claim 1, wherein the lever arm group is used in a multi-stage connection mode.

13. The circumferential lever booster according to claim 1, wherein the two eccentric axes of the input eccentric wheel and the output eccentric wheel are arranged at an angle.

14. The circumferential lever booster according to claim 1, wherein the circumferential lever booster is applied in a single-machine transmission mode or in a series combined transmission mode.

15. A transmission mode of the circumferential lever booster according to claim 1, comprising: applying an acting force to drive the input transmission part and the input eccentric wheel fixedly connected to the input transmission part to rotate, and meanwhile, enabling the second bearing fixedly connected to the input eccentric wheel about the input eccentric wheel to act on the one end of the lever arm group which is movably connected to or movably supported with the second bearing, so that a resultant force of circumferential swinging and axial prying acts on the lever arm group in a pushing and rotating mode, and then promoting the lever arm group to do circumferential swinging and axial reciprocating motion with a movable supporting or movable connecting position between the other end of the lever arm group and the support seat as a fulcrum; and meanwhile, using the third bearing fixedly connected to the output eccentric wheel about the eccentric axis of the output eccentric wheel and movably connected to the circumferential surface formed at the loading force end of the lever arm group for driving the output eccentric wheel to rotate, and then driving the output transmission part on the output eccentric wheel to output a boost.

16. The transmission mode of the circumferential lever booster according to claim 15, further comprising: enabling the lever arm group to movably connected to or movably supported with the second bearing fixedly connected to the input eccentric wheel by means of a swinging body; wherein one end of the swinging body is connected to a universal fulcrum fixed to the central axis of the machine body, and another end of the swinging body is movably connected to the second bearing fixedly connected to the input eccentric wheel.

17. A boosting method of the circumferential lever booster according to claim 1, comprising: using circumferential rotation eccentric acting force generated by rotation of the input eccentric wheel for driving the lever arm group to do circumferential swinging and axial reciprocating motion with a circumferential support position at one end as a fulcrum, thus an output eccentricity is effectively compensated while the circumferential surface of the lever arm group is pushed, rotated and pried to act on a load force on the output eccentric wheel, and therefore output boost is generated and transmitted.

18. The boosting method of the circumferential lever booster according to claim 17, further comprising: combining the plurality of lever arms arranged in the circumferential direction into the lever arm group so as to achieve prying forces of lever arms by an overall movement of the lever arms.

19. The boosting method of the circumferential lever booster according to claim 17, further comprising: integrating single lever arms into the lever arm group to achieve continuous and circulating prying in the circumferential direction, using prying forces accumulated on the circumference for achieving a continuous and overall circumferential circulating prying force, and therefore achieving boosting.

20. The boosting method of the circumferential lever booster according to claim 17, further comprising: stacking and connecting multi-stage lever arm groups to achieve boosting.

* * * * *